US012716687B2

(12) United States Patent
Sheets, Jr.

(10) Patent No.: US 12,716,687 B2
(45) Date of Patent: Aug. 25, 2026

(54) DEVICE, ASSEMBLY, SYSTEM AND METHOD FOR OPTICAL SIGHT USE

(71) Applicant: PRIMARY ARMS, LLC, Houston, TX (US)

(72) Inventor: Robert E. Sheets, Jr., Houston, TX (US)

(73) Assignee: PRIMARY ARMS, LLC, Houston, TX (US)

( * ) Notice: Subject to any disclaimer, the term of this patent is extended or adjusted under 35 U.S.C. 154(b) by 631 days.

(21) Appl. No.: 18/210,284

(22) Filed: Jun. 15, 2023

(65) Prior Publication Data

US 2023/0411763 A1 Dec. 21, 2023

Related U.S. Application Data

(60) Provisional application No. 63/353,002, filed on Jun. 16, 2022.

(51) Int. Cl.

| | |
|---|---|
| ***F41G 1/38*** | (2006.01) |
| ***G02B 23/16*** | (2006.01) |
| *F41G 1/34* | (2006.01) |
| *F41G 11/00* | (2006.01) |
| *G02B 23/14* | (2006.01) |

(52) U.S. Cl.

CPC ............... *F41G 1/38* (2013.01); *G02B 23/16* (2013.01); *F41G 1/345* (2013.01); *F41G 11/00* (2013.01); *G02B 23/14* (2013.01)

(58) Field of Classification Search

CPC . F41G 1/38; F41G 1/345; F41G 11/00; G02B 23/14; G02B 23/16

See application file for complete search history.

(56) References Cited

U.S. PATENT DOCUMENTS

| | | | |
|---|---|---|---|
| 5,189,555 | A | 2/1993 | Jorlov |
| 6,505,952 | B1 | 1/2003 | Kish et al. |
| 6,519,889 | B1 | 2/2003 | Schlierbach et al. |
| 7,806,331 | B2 | 10/2010 | Windauer et al. |
| 8,915,008 | B2 | 12/2014 | Mauricio et al. |
| 8,966,805 | B2 | 3/2015 | Koesler et al. |
| 9,074,846 | B2 | 7/2015 | Mencotti |

(Continued)

FOREIGN PATENT DOCUMENTS

| | | |
|---|---|---|
| CN | 109443088 A | 3/2019 |

OTHER PUBLICATIONS

PCT Notification of Transmittal of the International Search Report and the Written Opinion of the International Searching Authority, or the Declaration; Sep. 11, 2023; International Application No. PCT/US23/25467; International Searching Authority, United States Patent and Trademark Office.

(Continued)

*Primary Examiner* — Joshua E Freeman

(74) *Attorney, Agent, or Firm* — The Compton Law Firm, P.C.; Scott D. Compton

(57) ABSTRACT

The disclosure is directed to an accessory for use with one or more battery powered devices including one or more firearm optical sights. The accessory is operationally configured to be removably attached to a battery compartment of a battery powdered device and add one or more operating functions to the battery powered device when the accessory is electrical communication with the battery powered device.

18 Claims, 19 Drawing Sheets

(56) References Cited

U.S. PATENT DOCUMENTS

| | | | | |
|---|---|---|---|---|
| 9,982,965 | B2 * | 5/2018 | Sun | F41G 1/345 |
| 10,054,399 | B2 | 8/2018 | VanBecelaere | |
| 10,101,122 | B2 * | 10/2018 | Davidson | F41G 1/38 |
| 11,236,971 | B2 | 2/2022 | Sheets, Jr. | |
| 2004/0148841 | A1 | 8/2004 | Burzel | |
| 2010/0220309 | A1 | 9/2010 | Zhu et al. | |
| 2011/0162251 | A1 * | 7/2011 | Houde-Walter | F41G 1/35 42/146 |
| 2012/0151816 | A1 * | 6/2012 | Kleck | F41G 1/30 42/111 |
| 2013/0174490 | A1 * | 7/2013 | Crispin | F41G 1/38 49/394 |
| 2013/0253820 | A1 | 9/2013 | Denk | |
| 2014/0101982 | A1 | 4/2014 | McPhee | |
| 2014/0237884 | A1 * | 8/2014 | Koesler | F41G 1/345 42/111 |
| 2014/0360581 | A1 | 12/2014 | Ninomiya et al. | |
| 2016/0356573 | A1 | 12/2016 | Berlips et al. | |
| 2017/0082400 | A1 | 3/2017 | York et al. | |
| 2017/0363387 | A1 * | 12/2017 | Sun | F41G 1/383 |
| 2018/0010887 | A1 * | 1/2018 | VanBecelaere | G02B 23/16 |
| 2019/0297232 | A1 * | 9/2019 | Alsheuski | F41G 1/32 |
| 2021/0010784 | A1 * | 1/2021 | Sheets, Jr. | G02B 27/34 |
| 2021/0348886 | A1 | 11/2021 | Havens et al. | |
| 2022/0221250 | A1 * | 7/2022 | McCall, Jr. | F41G 1/44 |
| 2023/0392900 | A1 * | 12/2023 | Davidson | F41G 3/2644 |

OTHER PUBLICATIONS

Sheets, Jr., Claims 1-19 of the International Application No. PCT/US23/25467; Jun. 15, 2023.

* cited by examiner 100
105
114
106
123
107
179
122
161
160
165
164
A
101
102
147
113
120
141
103
104
116
126
143
138
47
140
135
128
150
152
125
35
40
154
132
142
136
117
129
137
134
127
145
144
110
111
131
175
133
177

DEVICE, ASSEMBLY, SYSTEM AND METHOD FOR OPTICAL SIGHT USE

CROSS-REFERENCE TO RELATED APPLICATIONS

This application is entitled to the benefit of the filing date of the prior-filed U.S. provisional application No. 63/353,002, filed on Jun. 16, 2022.

BACKGROUND OF THE DISCLOSURE

1. Field of the Disclosure

This disclosure relates generally in the field of optical sights for projectile launching devices including, but not limited to firearms.

2. Background Art

Conventional optical sights are designed to enhance an image for viewing and/or aiming purposes. Other optical sights are manufactured to provide one or more additional operating functions, for example, one or more motion sensors for automatic ON/OFF powering, tilt sensors, light sensors, thermal sensors, touch sensors, shock sensors, biometric security, cameras, clocks, timers, GPS positioning, digital displays, digital shot counters, illumination sources, manual controls, electrical communication ports or interfaces, microphones, audible speakers, electronic compasses, bubble levels, and wireless connectivity. Commercially available optical sights with these types of operating functions are typically more expensive than conventional optical sights and conventional optical sights are not configured to add these types of operating functions post production.

Overcoming the above shortcomings is desired.

SUMMARY OF THE DISCLOSURE

The present disclosure provides an accessory for use with a battery powered device, comprising (a) a battery compartment, the battery compartment comprising electrical input contacts; (b) control circuitry in electrical communication with the electrical input contacts; and (c) circuitry-controlled electrical output contacts; (d) wherein when the accessory is in electrical communication with a power source and when the accessory is in electrical communication with the battery powered device, then the control circuitry is operationally configured to add one or more operating functions to the battery powered device.

The present disclosure also provides an accessory for use with a device having a coin cell battery compartment, comprising (a) a battery compartment, the battery compartment comprising electrical input contacts operable with a coin cell battery; (b) a battery compartment cover; (c) control circuitry in electrical communication with the electrical input contacts; and (d) circuitry-controlled electrical output contacts; (e) wherein when the accessory is in electrical communication with the coin cell battery and when the accessory is in electrical contact with the coin cell battery compartment of the device, then the control circuitry is operationally configured to add one or more operating functions to the device.

The present disclosure also provides a method of providing one or more operating functions to a battery powered device powered by one or more removable batteries, comprising (a) electrically communicating an accessory with a battery powered device battery compartment of the battery powered device, the accessory comprising (1) a main body removably attachable to the battery powered device battery compartment, the main body including (i) a battery compartment, the battery compartment comprising electrical input contacts; (ii) control circuitry in electrical communication with the electrical input contacts; and (iii) circuitry-controlled electrical output contacts; (iv) wherein when the accessory is in electrical communication with a power source and when the accessory is in electrical communication with the battery powered device battery compartment, then the control circuitry is operationally configured to add the one or more operating functions to the battery powered device.

DEFINITIONS USED IN THE DISCLOSURE

Figure 1:
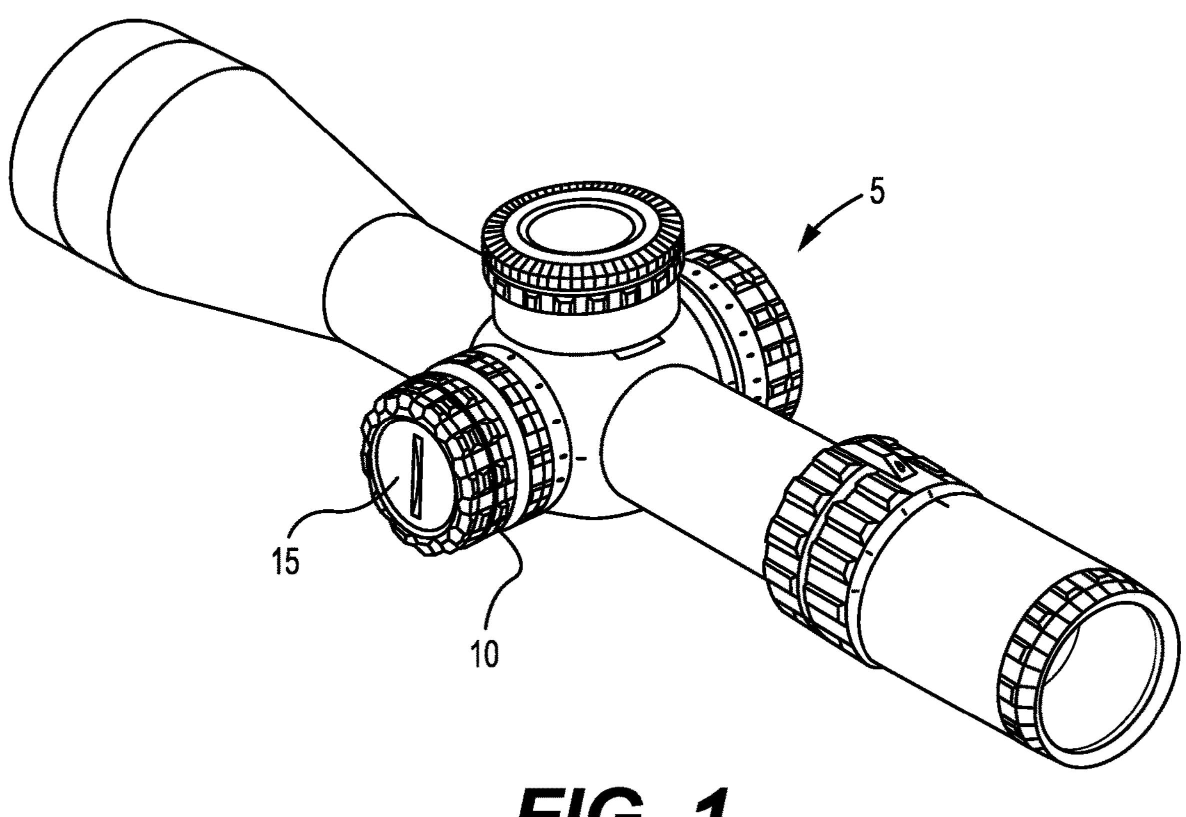
FIG. 1 is a top perspective view of an exemplary coin cell battery powered optical sight commercially available at the time of this disclosure.

The term “at least one”, “one or more”, and “one or a plurality” mean one thing or more than one thing with no limit on the exact number; these three terms may be used interchangeably within this disclosure. For example, at least one device means one or more devices or one device and a plurality of devices.

The term “about” means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term “substantially” or “essentially” means that a value of a given quantity is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

The term “and/or” includes any and all combinations of one or more of the associated listed items.

DETAILED DESCRIPTION OF THE DISCLOSURE

For the purposes of promoting an understanding of the principles of the disclosure, reference is now made to the embodiments illustrated in the drawings and particular language will be used to describe the same. It is understood that no limitation of the scope of the claimed subject matter is intended by way of the disclosure.

The terms “first,” “second,” “third,” and the like, herein do not denote any order, quantity, or importance, but rather are used to distinguish one element from another.

As used herein, the terms “may” and “may be” indicate a possibility of an occurrence within a set of circumstances; a possession of a specified property, characteristic or function; and/or qualify another verb by expressing one or more of an ability, capability, or possibility associated with the qualified verb. Accordingly, usage of “may” and “may be” indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms “may” and “may be.”

Terms and phrases used in this document, and variations thereof, unless otherwise expressly stated, should be construed as open-ended as opposed to limiting. As examples of the foregoing: the term “including” should be read as meaning “including, without limitation” or the like, the term “example” is used to provide exemplary instances of the item in discussion, not an exhaustive or limiting list thereof, the terms “a” or “an” should be read as meaning “at least one,” “one or more,” or the like. The use of the term “assembly” does not imply that the components or functionality described or claimed as part of an assembly are all necessarily configured in a common package.

In this disclosure, an “optical sight” is discussed in terms of use with one or more projectile launching devices. In addition, the terms “optical sighting system,” “scope,” and “optical platform” may be used interchangeably with “optical sight.” In this disclosure, reference to one or more “commercially available” optical sights includes optical sights commercially available as of the time of this disclosure and other optical sights made commercially available at a date later than this disclosure.

Herein, a “projectile launching device” may include, but is not necessarily limited to a firearm and an archery bow. A firearm may include, but is not limited to a rifle, a shotgun, a pistol, a revolver, a shoulder fired bazooka, a shoulder fired rocket launcher, an air rifle, and a paintball gun. In addition, a firearm may include any type of action, for example, lever action, pump action, bolt action, break action. A firearm may be provided as a hand held firearm or a firearm mounted to a vehicle, watercraft or other mode of transportation. A firearm may be provided as a single shot, automatic or semiautomatic firearm. As understood by the skilled artisan, a particular firearm may be provided in different barrel lengths. An archery bow may include, but is not limited to a crossbow, a compound bow, a recurve bow or other device from which one or more arrows may be projected.

Exemplary optical sights for use with one or more types of projectile launching devices may include, but are not limited to one or more telescopic riflescopes, one or more red dot sights, one or more prism sights, and one or more holographic sights as such terms are understood by persons of ordinary skill in the art firearm optics. Common telescopic riflescopes include fixed magnification scopes and variable magnification scopes. Herein, a "riflescope" refers to an optical sight used with a rifle and a "pistol scope" refers to an optical sight used with a pistol.

The terms "optical sight reticle," "reticle" and "reticule" in relation to projectile launching devices each refers to lines and/or other markings or indicia found on an eyepiece of an optical sight. For purposes of this disclosure, the terms "optical sight reticle," "reticle" and "reticule" may be used interchangeably. Also, the term "ON/OFF feature" may be used interchangeably with the terms "ON/OFF switch" and "ON/OFF function." In this disclosure, an "illuminated reticle" refers to a reticle of an optical sight that may be illuminated via electrical components including a power source and one or more electrically powered and electrically controlled light sources of the optical sight. Exemplary light sources may include, but are not limited to one or more incandescent bulbs, one or more fluorescent bulbs, one or more light emitting diodes ("LEDs"), one or more resonant cavity light-emitting diodes ("RCLEDs"), one or more diode lasers, one or more organic LEDs, one or more vertical cavity surface emitting laser diodes ("VCSELs"), and combinations thereof. In one non-limiting embodiment, a reticle may be illuminated via a light emitting diode ("LED") or an LED array and/or (2) a resonant cavity light-emitting diode ("RCLED") or an RCLED array. In another embodiment, a reticle may be illuminated via a diode laser, e.g., a reticle of a holographic optical sight. In another embodiment, a reticle may be illuminated via a liquid crystal display ("LCD"). In another embodiment, a reticle may be illuminated via an organic light-emitting diode ("OLED") display. In another embodiment, a reticle may be illuminated via a vertical cavity surface emitting laser diode ("VCSEL").

Herein, "electrical power" is the product of current and voltage. A "power source" of a device of this disclosure may include one or more batteries, one or more capacitors, one or more wireless charging circuits, one or more power jacks providing electrical power from one or more external sources, one or more kinetic energy harvester devices, and combinations thereof. A battery as discussed herein may include one or more batteries having (1) one or more sizes and/or configurations including, but not limited to AA batteries, AAA batteries, AAAA batteries, C batteries, D batteries, 9V batteries, CR123A batteries, 23A batteries, and coin cell batteries, (2) one or more types including, but not limited to lithium batteries, alkaline batteries, carbon zinc batteries, silver oxide batteries, zinc air batteries, rechargeable batteries, e.g., lithium-ion batteries, nickel cadmium (NiCd) batteries, nickel metal hydride (NiMH) batteries, and combinations thereof. As understood by the skilled artisan, a coin cell battery is commonly used to power electronics devices including but not limited to wrist watches, pocket calculators, small LED powered flash lights, automobile keyless entry transmitters, pedometers, optical sights, and the like. In this disclosure, the terms "button cell battery," "button cell," "button style battery," "coin cell battery," "coin cell" and "coin style battery" may be used interchangeably. Herein, "OE" stands for original equipment and "OEM" stands for original equipment manufacturer.

In an embodiment, the present disclosure is directed to an accessory that may be installed onto a device or "host device" that is powered by one or more removable batteries in a manner effective to add one or more operating functions (or "functions") to the device.

In another embodiment, the present disclosure is directed to a device that may be installed onto an optical sight in a manner effective to add one or more operating functions to the optical sight.

In another embodiment, the present disclosure is directed to a multifunction add-on assembly for one or more optical sights.

In another embodiment, the present disclosure is directed to a multifunction battery compartment for one or more optical sights.

In another embodiment, the present disclosure is directed to a portable multifunction device for one or more optical sights.

In another embodiment, the present disclosure is directed to a multifunction add-on power supply system for one or more optical sights.

In another embodiment, the present disclosure is directed to a function adding device for installation onto at least one optical sight including, but not limited to at least one commercially available optical sight.

In another embodiment, the present disclosure is directed to a system and method for adding one or more operating functions to one or more optical sights.

In another embodiment, the present disclosure is directed to a method of adding one or more operating functions to one or more optical sights by installing onto one or more optical sights a device or assembly operationally configured to add one or more operating functions to the one or more optical sights when the device or assembly is electrically communicated with a battery compartment of the one or more optical sights.

In another embodiment, the present disclosure is directed to a battery adapter device for one or more optical sights. One suitable battery adapter device is operationally configured to change the type of battery used as the power source of an optical sight compared to the OE battery requirements for the optical sight. In one non-limiting example, an optical sight may be provided comprising an OE battery compartment operationally configured for a CR2032 coin cell lithium battery and a battery adapter device operationally configured to electrically communicate with the OE battery compartment may comprise a battery compartment operationally configured for a CR1632 coin cell lithium battery as a power source for the optical sight.

In another embodiment, the present disclosure is directed to a motion sensing battery compartment removably attachable to a battery compartment of one or more optical sights in a manner effective to provide electrical power to the one or more optical sights according to programmed operation of a motion sensor of the motion sensing battery compartment.

In another embodiment, the present disclosure is directed to a device that may be installed onto an empty, i.e., a battery free, battery compartment of an optical sight in a manner effective to add one or more operating functions to the optical sight. In an embodiment, the device may include a battery compartment operationally configured to receive the same or like removable battery cover in threaded communication as the optical sight for housing the same or like battery as the optical sight therein.

In another embodiment, the present disclosure is directed to a method for adding motion sensing to an optical sight by installing onto a battery compartment of the optical sight a device operationally configured to provide a motion sensing automatic ON/OFF power function to the optical sight.

In another embodiment, the present disclosure is directed to a method for adding low battery sensing and low battery indication to an optical sight by installing onto a battery compartment of the optical sight a device operationally configured to provide a low battery sensing and low battery indication function to the optical sight.

In another embodiment, the present disclosure is directed to a method for retrofitting an optical sight to include one or more operating functions not provided as part of the manufactured design of the optical sight.

In another embodiment, the present disclosure is directed to a method of changing one or more add-on operating functions for an optical sight by using two or more multifunction add-on devices that may be interchangeably installed onto an optical sight as desired to make use of one or more operating functions provided by a particular multifunction add-on device.

In another embodiment, the present disclosure is directed to a system for providing add-on operation function interchangeability for one or more optical sights. In an embodiment, the system includes one or more optical sights and one or more devices operationally configured to provide one or more add-on operating functions to the one or more optical sights. In an embodiment, the system includes one or more optical sights and one or more multifunction add-on devices for one or more optical sights.

In another embodiment, the present disclosure is directed to an assembly for adding one or more operating functions to one or more optical sights. In an embodiment, the assembly comprises at least a housing including a battery compartment, control circuitry, and positive and negative power output electrical contacts.

In another embodiment, the present disclosure is directed to a motion sensing coin cell battery compartment device, assembly, system and method for one or more optical sights. In an embodiment, the motion sensing battery compartment device may be operationally configured as an OE battery compartment for one or more optical sights. In another embodiment, the motion sensing battery compartment may be operationally configured as a substitute battery compartment for one or more optical sights.

In another embodiment, the present disclosure is directed to a low battery sensing coin cell battery compartment device, assembly, system and method for one or more optical sights.

In another embodiment, the present disclosure is directed to a motion sensing battery compartment for installation onto a battery compartment of one or more firearm optical sights. Once installed onto a firearm optical sight, the motion sensing battery compartment is operationally configured to detect motion of the optical sight and control powering of the optical sight according to movement of the optical sight.

In another embodiment, the present disclosure is directed to a motion sensing battery compartment operationally configured to electrically communicate with battery compartments of one or more optical sights in a manner effective to control powering of the one or more optical sights according to detected motion of the one or more optical sights.

In another embodiment, the present disclosure is directed to a substitute battery compartment for one or more optical sights that is operationally configured to provide at least motion sensing automatic ON/OFF power functionality to the one or more optical sights when electrically communicated with a battery compartment of the one or more optical sights.

In another embodiment, the present disclosure is directed to a portable battery compartment for one or more optical sights. In an embodiment, the portable battery compartment comprises an automatic ON/OFF power function operationally configured for use with one or more optical sights.

In another embodiment, the present disclosure is directed to a system comprising (1) a removable motion sensing battery compartment device for one or more optical sights, the motion sensing battery compartment device being operable with a battery compartment of one or more commercially available optical sights, and (2) a removable coin cell battery, wherein the removable motion sensing battery compartment device comprises control circuitry operationally configured to provide automatic ON/OFF powering of one or more optical sights including, but not necessarily limited to one or more third party firearm optical sights known at the time of this disclosure.

In another embodiment, the present disclosure is directed to a motion sensing device for one or more optical sights, the motion sensing device having control circuitry and a threaded surface operationally configured for use with battery compartments of the one or more optical sights. The motion sensing device is operationally configured to (1) electrically communicate with the electrical contacts within a battery compartment of a particular optical sight and (2) electrically communicate with a coin cell battery including, but not limited to a coin cell battery common to the optical sight, i.e., the same or like coin cell battery powering the optical sight.

In another embodiment, the present disclosure is directed to a motion sensing assembly for use with an optical sight of a projectile launching device, the optical sight having a battery compartment and a corresponding removable battery cover, wherein the motion sensing assembly is operationally configured to electrically communicate with the battery compartment of the optical sight in a manner effective to power the optical sight. Suitably, the motion sensing assembly comprises a main body operationally configured to house a coin cell battery and an attachment surface for the removable battery cover or a like removable battery cover that is operationally configured to enclose the coin cell battery in the battery compartment of the main body. When a coin cell battery is enclosed in the main body, the motion sensing battery compartment is operationally configured to power the optical sight according to detected motion of the optical sight.

In another embodiment, the present disclosure is directed to a motion sensing battery compartment for use with one or more optical sights of one or more projectile launching devices, wherein each of the one or more optical sights includes an OE battery compartment and a corresponding removable battery cover as part of its original construction for housing a removable coin cell battery.

In another embodiment, the present disclosure is directed to a removable accessory operationally configured be removably attached to a battery compartment of a host device in a manner the same or similar that a host device battery cover is attached and removed on and off from the battery compartment of the host device. For example, in an embodiment of a host device battery compartment operationally configured to receive a battery cover in threaded communication, an accessory of this disclosure may be operationally configured to be threadedly communicated to the battery compartment of the host device. In an embodiment of a host device battery compartment operationally configured to receive a battery cover in a snap-on communication, an accessory of this disclosure may be operationally configured to include a snap-on configuration for communicating with the battery compartment of the host device. In an embodiment of a host device battery compartment operationally configured to receive a battery cover in a quarter-turn type locking cover communication, an accessory of this disclosure may be operationally configured to include a quarter-turn locking type configuration for communicating with the battery compartment of the host device. In an embodiment of a host device battery compartment operationally configured to receive a battery cover that is removably hingedly attached to the host device, an accessory of this disclosure may be hingedly attached to the host device in a manner effective for the accessory to communicate with the battery compartment of the host device.

Suitably, a device as described herein is operationally configured for use with one or more devices powdered by one or more removable batteries including, but not limited to one or more optical sights comprising a battery compartment. Referring to FIGS. 1-9, in at least one embodiment a device of this disclosure is operationally configured for use with coin cell battery compartments of one or more battery powered host devices such as one or more optical sights, including, but not limited to (1) one or more riflescopes 5, (2) one or more reflex tube sights 6 (hereafter referred to as "red dot sights 6"), and (3) one or more prism sights 7—which may be collectively referred to herein as "optical sights 5, 6, 7." Non-limiting examples of coin cell battery powered riflescopes 5 are described herein in reference to FIGS. 1 and 7. Non-limiting examples of coin cell battery powered red dot sights 6 are described herein in reference to FIGS. 2, 5 and 6, and a non-limiting example of a coin cell battery powered prism sight 7 is described herein in reference to FIG. 3. In an embodiment, a device of this disclosure may be operationally configured to electrically communicate with an empty coin cell battery compartment of an optical sight 5, 6 or 7 in a manner effective to at least add one or more operating functions to the optical sight 5, 6 or 7. In another embodiment, a device of this disclosure may be operationally configured to electrically communicate with an empty coin cell battery compartment of an optical sight 5, 6 or 7 in a manner effective to add one or more operating functions and supply electrical power to the optical sight 5, 6 or 7.

Figure 2:
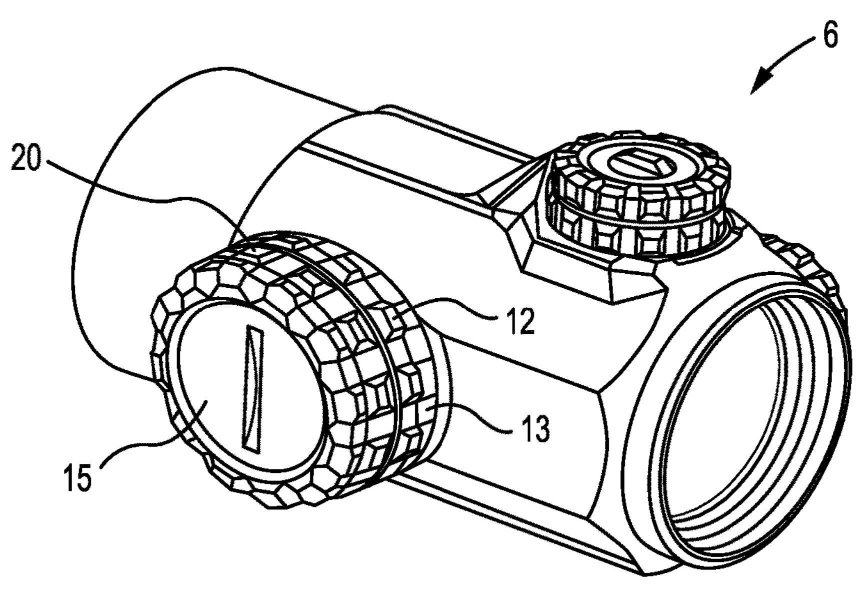
FIG. 2 is a top perspective view of another exemplary coin cell battery powered optical sight commercially available at the time of this disclosure.
Figure 3:
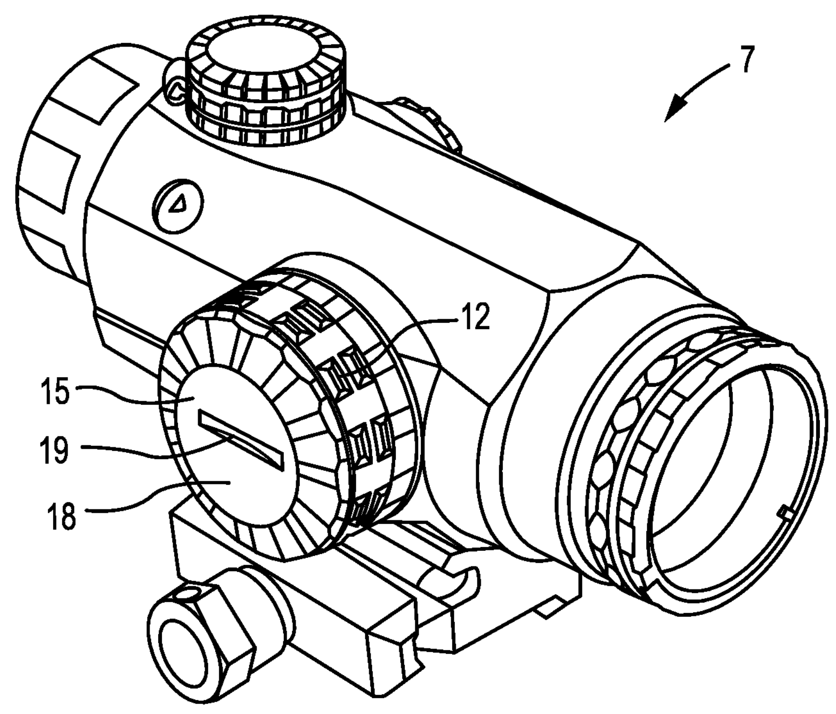
FIG. 3 is a top perspective view of another exemplary coin cell battery powered optical sight commercially available at the time of this disclosure.
Figure 4:
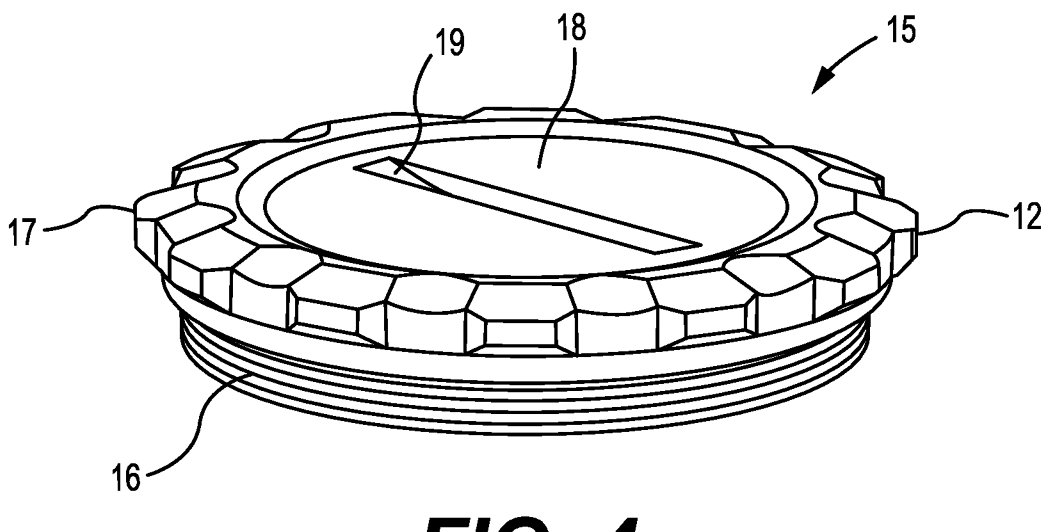
FIG. 4 is a top perspective view of a removable battery compartment cover of a coin cell battery powered optical sight as shown in FIGS. 1-3.

With particular reference to FIGS. 1-5, commercially available optical sights 5, 6, 7 at the time of this disclosure commonly include a power input system comprising (1) a coin cell battery compartment 10 ("battery compartment 10") and (2) a removable battery compartment cover 15 ("battery cover 15") operationally configured to secure a power source such as a removable coin cell battery 35 within the battery compartment 10 in a manner effective for the coin cell battery 35 to supply electrical power to the optical sight. As shown, typical battery compartments 10 are provided as knob or turret type structures or bodies with a cylindrical inner surface of a size suitable for housing a circular coin cell battery 35 therein (see FIG. 5) and having a removable battery cover 15 effective to enclose the coin cell battery 35 within the battery compartment 10 as shown in FIGS. 1-3. As shown in FIG. 4, a battery cover 15 typically has a cylindrical outer threaded surface 16 for threaded communication with an inner threaded surface 11 (see FIG. 5) of a battery compartment 10 allowing the battery cover 15 to be screwed on and off of the battery compartment 10 as desired. In terms of commercially available optical sights 5, 6, 7 for firearm use, a threaded surface 11 of a battery compartment 10 commonly has an inner thread diameter of or about 22.0 mm (0.87 inches) to or about 26.0 mm (1.02 inches) although other inner thread diameters are herein contemplated as an optical sight 5, 6, or 7 may be built to scale.

Depending on the make and/or model of a particular optical sight 5, 6, or 7, a battery compartment 10 may also comprise one or more rotary dials 20 (see FIG. 2) operationally configured to control one or more operating functions of an optical sight, for example, (1) to adjust LED brightness for illuminating a corresponding reticle of the optical sight; and/or (2) to turn the optical sight ON/OFF. In such an embodiment, the battery cover 15 may have an outer perimeter surface 17 the same or substantially similar in appearance and/or outer diameter as the outer surface 13 of all or a portion of the battery compartment 10 and/or the rotary dial 20 thereby providing an aesthetically consistent exterior appearance and bettering manual operation of the rotary dial 20 and battery cover 15. For example, in an embodiment an outer surface 13 of a battery compartment 10, battery cover 15 and rotary dial 20 may include a textured outer surface including one or more raised surfaces 12 for ease of finger manipulation (see FIG. 2). Non-limiting examples of raised surfaces 12 include, but are not limited to raised bumps, dimples, grooves, knurling, and combinations thereof.

Referring to FIGS. 3 and 4, the outermost surface 18 of a battery cover 15 may include one or more surface configurations including an ornamental appearance as desired, for example, a slightly curved surface or a planar or partially planar surface or other ornamental appearance. In addition, an outermost surface 18 may also include at least one slotted surface 19 for receiving a tool therein to assist in turning the battery cover 15 both clockwise and counter-clockwise when screwing the battery cover 15 on and off of a corresponding battery compartment 10. Common tools for use with a slotted surface 19 may include, but are not limited to a manufacturer provided tool, a screwdriver or other hand held tool. As understood by the skilled artisan, a common battery cover 15 may also include a slotted surface 19 with a size effective to receive part of a monetary coin therein, e.g., a United States penny, quarter, nickel, dime, and/or the equivalent to assist in turning the battery cover 15. As such, a slotted surface 19 of a battery cover 15 is commonly referred to in the art as a "coin-slot."

Figure 8:
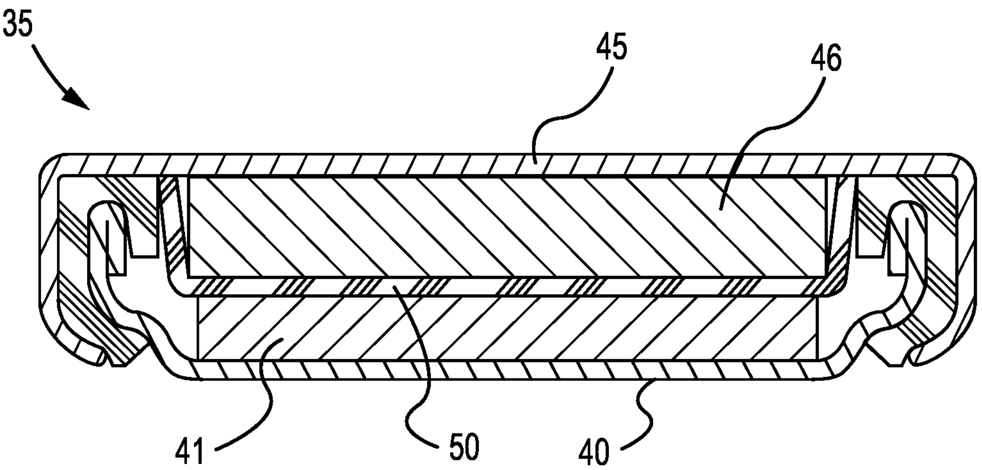
FIG. 8 is a sectional side view of an embodiment of a coin cell battery operable with an optical sight as shown in FIGS. 1-3 and 7.

Coin cell batteries 35 operable for powering optical sights 5, 6, 7 are typically of the conventional type as shown in the simplified illustration of FIG. 8, including an anode case 40, an anode 41, a cathode case 45, a cathode 46 and a separator 50 disposed between the anode 41 and cathode 46. In the embodiment of FIG. 8, the anode case 40 forms the negative terminal and the cathode case 45 forms the positive terminal of the coin cell battery 35. The orientation of a coin cell battery 35 within a battery compartment 10 is suitably determined according to the orientation of the electrical input contacts within the battery compartment 10, for example, see FIG. 5, which depicts a coin cell battery 35 located within a battery compartment 10 with the positive cathode case 45 side of the coin cell battery 35 facing outward.

Conventional coin cell batteries 35 for optical sights 5, 6, 7 typically have a service life up to or about 50,000 hours and are offered in various sizes, for example, in a diameter of or about 16.0 mm to or about 20.0 mm and a height (or thickness) of or about 3.2 mm—or other dimensions as may be desired according to operational power and/or size requirements of a particular optical sight 5, 6, or 7. One non-limiting example of a coin cell battery 35 for use with optical sights 5, 6, 7 comprises a lithium coin cell battery including, but not limited to a CR2032 coin cell lithium battery having specifications as shown in Table 1. Another non-limiting example of a coin cell battery 35 for use with optical sights 5, 6, 7 comprises a lithium coin cell battery including, but not limited to a CR1632 coin cell lithium battery having specifications as shown in Table 2. Another non-limiting example of a coin cell battery 35 that may be used with an optical sight 5, 6, or 7 includes a LR44/AG13 alkaline zinc manganese coin cell battery.

TABLE 1

| Specifications: CR2032 coin cell lithium battery | |
|---|---|
| Capacity | 225.0 mAh |
| Chemical System | Lithium Manganese Dioxide |
| Dimensions | 20.0 mm × 3.2 mm |
| Operating Temperature | −30.0 to 60.0° C. |
| Weight | 2.9 g |
| Voltage Rating | 3.0 V |

TABLE 2

| Specifications: CR1632 coin cell lithium battery | |
|---|---|
| Capacity | 140.0 mAh |
| Chemical System | Lithium Manganese Dioxide |
| Dimensions | 16.0 mm × 2.0 mm |
| Operating Temperature | −30.0 to 60.0° C. |
| Weight | 1.8 g |
| Voltage Rating | 3.0 V |

Figure 5:
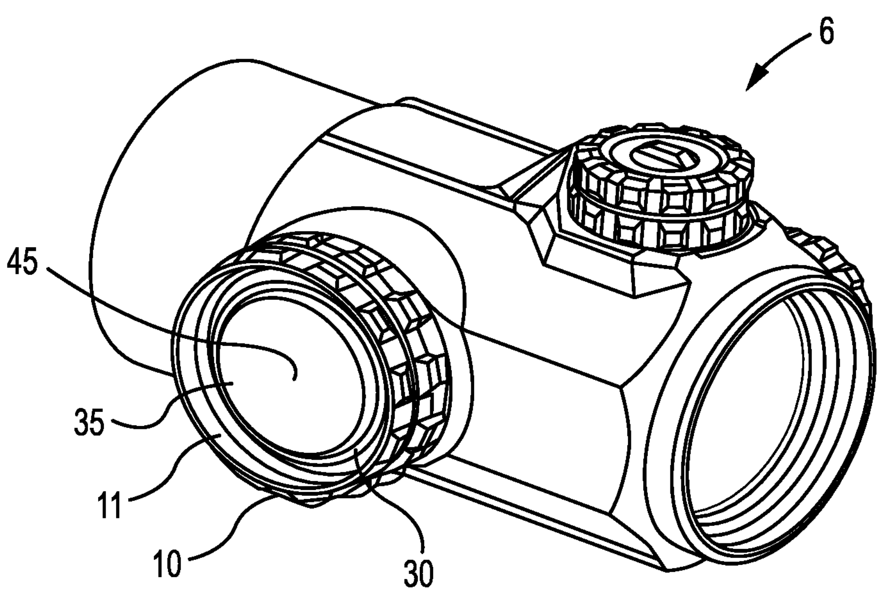
FIG. 5 is another top perspective view of the coin cell battery powered optical sight of FIG. 2 with the battery compartment cover removed from the battery compartment of the optical sight.

With reference to FIG. 5, a battery compartment 10 of an optical sight 5, 6, or 7 is suitably provided with sufficient space to house a particular size coin cell battery 35 within the battery compartment 10 without hindering a battery cover 15 from being properly secured to the battery compartment 10 as depicted in FIGS. 1, 2 and 3.

Figure 6:
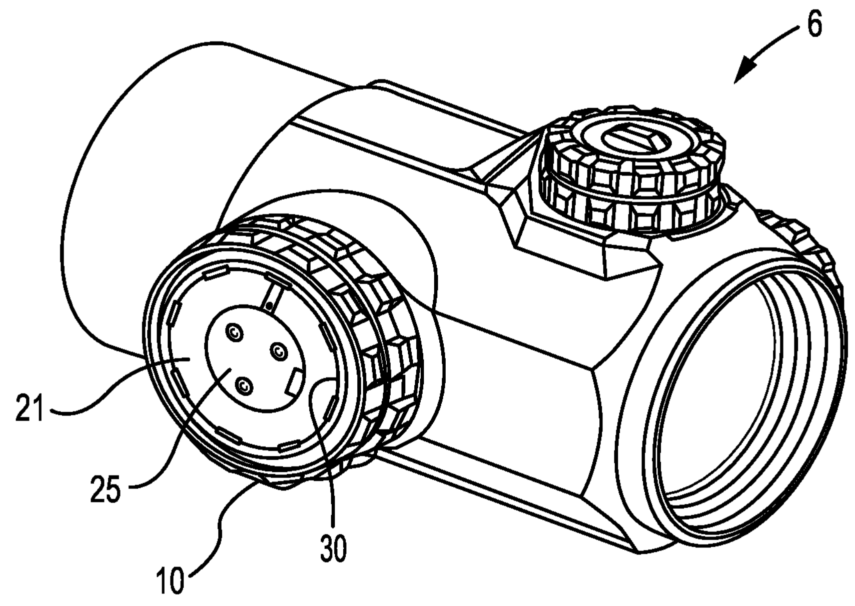
FIG. 6 is another top perspective view of the coin cell battery powered optical sight of FIG. 2 with the battery compartment cover and the coin cell battery removed from the battery compartment of the optical sight.
Figure 7:
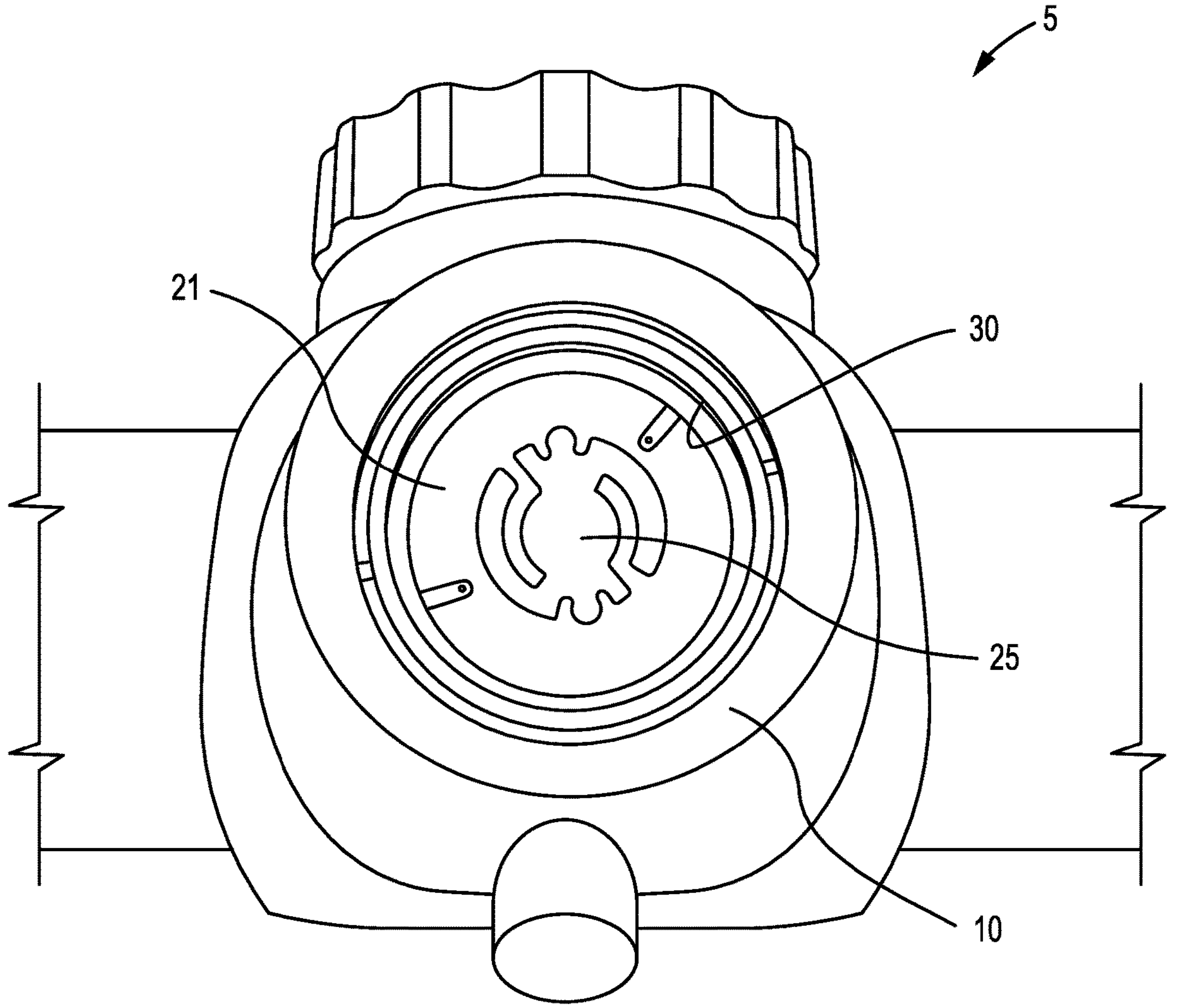
FIG. 7 is a perspective view of part of a coin cell battery powered optical sight commercially available at the time of this disclosure with an empty battery compartment exposing an inner surface of the battery compartment.

As shown in FIGS. 6 and 7, a battery compartment 10 of an optical sight 5, 6, or 7 typically includes a floor 21 for receiving a coin cell battery 35 wherein the floor 21 comprises a negative contact 25, e.g., a negative contact plate or the like, operationally configured to contact an anode case 40 of a coin cell battery 35 when the coin cell battery 35 is housed within the battery compartment 10. As also shown in FIGS. 6 and 7, an operable negative contact 25 is not limited to a particular shape or form. Herein, negative contact 25 may also be referred to as "negative battery contact 25."

Still referring to FIGS. 6 and 7, a battery compartment 10 also includes a positive contact 30 such as a positive contact ring, along the inner perimeter of the battery compartment 10 operationally configured to contact a cathode case 45 of a coin cell battery 35 along the outer perimeter of a coin cell battery 35 to complete an electric circuit, thereby providing power to control circuitry of an optical sights 5, 6, or 7, e.g., providing power to a light source such as a LED or LED array and/or other electronics of an optical sights 5, 6, or 7. Herein, positive contact 30 may also be referred to as "positive battery contact 30."

Figure 9:
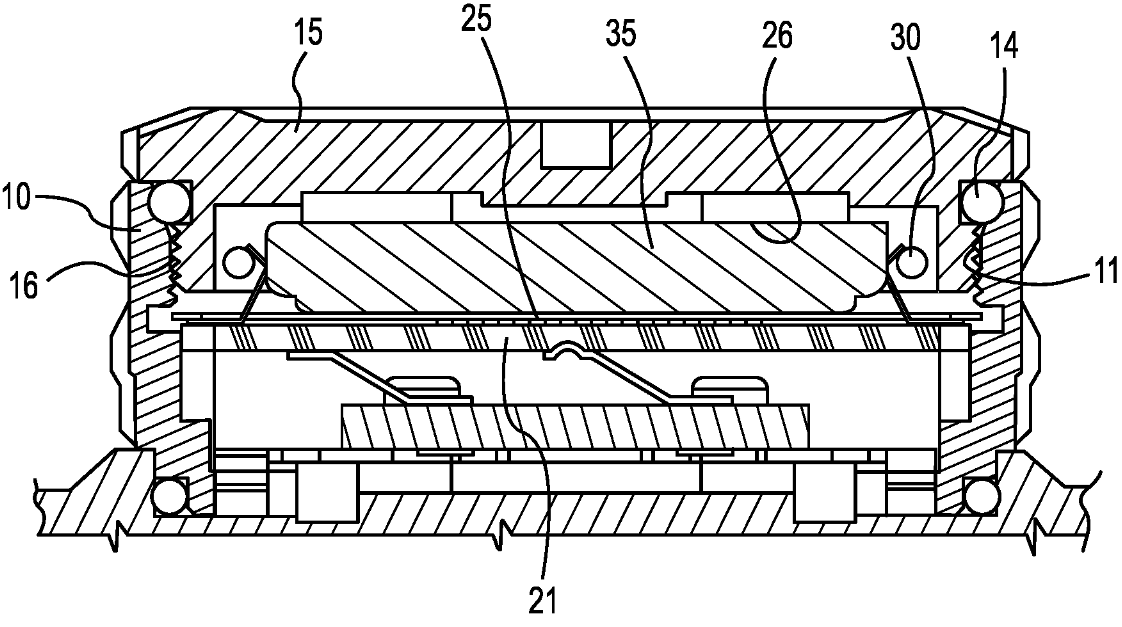
FIG. 9 is a sectional side view of an exemplary battery compartment of a coin cell battery powered optical sight as shown in FIGS. 1-3 and 7 including a coin cell battery housed therein and a removable battery compartment cover attached thereto.

Referring to FIG. 9, in operation when a battery cover 15 is turned closed to a desired tightened position with a battery compartment 10, the inner surface 26 of the battery cover 15 suitably applies a force to the coin cell battery 35 therein maintaining proper contact of the coin cell battery 35 with the negative contact 25 and the positive contact 30. In an embodiment including a seal member or seal such as an O-ring 14 to prevent moisture and/or dirt from entering the battery compartment 10 during use, part of the battery cover 15 also suitably applies a force to the battery compartment 10 to form a seal with the O-ring 14.

At the time of this disclosure, non-limiting examples of commercially available riflescopes 5 using a coin cell battery 35 include the Primary Arms® SLx 1-6×24 mm SFP Rifle Scope Gen III and the Primary Arms® SLx 3-18×50 mm FFP Rifle Scope available from Primary Arms, L.L.C., Houston, Texas, U.S.A. Non-limiting examples of commercially available red dot sights 6 using a coin cell battery 35 at the time of this disclosure include the Primary Arms® SLx Advanced Rotary Knob Microdot Red Dot Sight and the Primary Arms® SLx MD-25 Rotary Knob 25 mm Microdot available from Primary Arms, L.L.C., Houston, Texas, U.S.A. Non-limiting examples of commercially available prism sights 7 using a coin cell battery 35 at the time of this disclosure include the Primary Aims® SLx 5×36 mm Gen III Prism Scope, the Primary Arms® SLx 1× MicroPrism Prism Scope, and the Primary Arms® GLx 2× Prism Scope available from Primary Arms, L.L.C., Houston, Texas, U.S.A. While the above non-limiting examples of commercially available optical sights 5, 6, 7 include a battery compartment 10 with a rotary dial 20, one non-limiting example of a commercially available optical sight having a coin cell battery compartment 10 without a rotary dial 20 includes a red dot sight 6 such as the Primary Arms® SLx Advanced Push Button Micro Red Dot Sight—Gen II available from Primary Arms, L.L.C., Houston, Texas, U.S.A.

Figure 10:
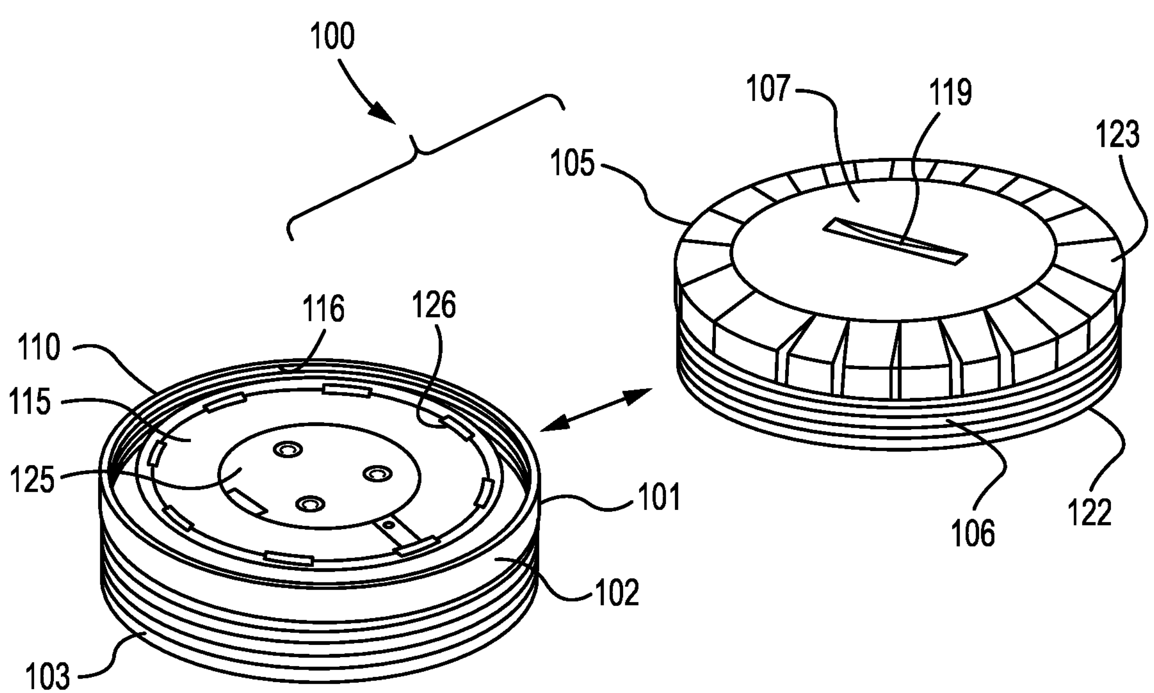
FIG. 10 is a perspective view of an embodiment of a disassembled device of this disclosure.
Figure 11:
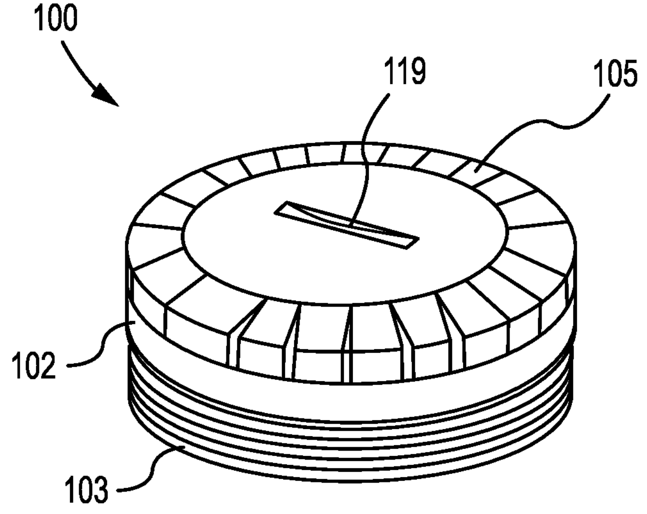
FIG. 11 is a perspective view of an assembled device of FIG. 10.
Figure 12:
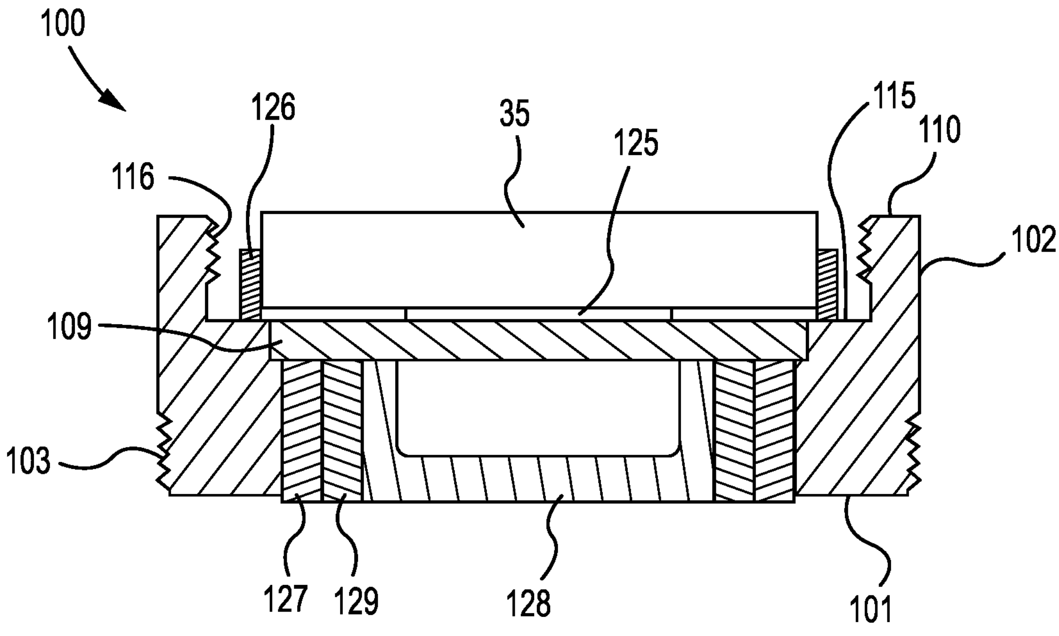
FIG. 12 is a sectional side view of the device of FIGS. 10-11.

FIGS. 10-12 illustrate an embodiment of an accessory 100 (hereafter "device 100") of this disclosure operationally configured for use with one or more coin cell battery powered optical sights including, but not limited to one or more of optical sights 5, 6, 7. In this embodiment, the device 100 is operationally configured as an electro-mechanical interface for supplying electrical power and adding one or more operating functions to a corresponding optical sight 5, 6, or 7. In particular, the device 100 comprises at least a main body 101 housing control circuitry 109, and once the device 100 is electrically communicated with a battery compartment 10 of an optical sight 5, 6, or 7, the device 100 is operationally configured to supply electrical power and add one or more operating functions to the optical sight 5, 6, or 7.

With particular reference to FIGS. 10 and 12, the main body 101 includes a battery compartment 110 comprising electrical input contacts including at least a negative battery contact 125 and a positive battery contact 126 in electrical communication with control circuitry 109 of the device 100 wherein the negative battery contact 125 and positive battery contact 126 are operationally configured to make electrical contact with a coin cell battery 35 that is housed in the battery compartment 110 for suppling electrical power to both the device 100 and to the optical sight 5, 6, or 7 to which the device 100 is installed. The main body 101 also includes circuitry-controlled electrical output contacts housed in the main body 101 including a positive power output contact or positive terminal 127 and a negative power output contact or negative terminal 128 in electrical communication with the control circuitry 109 and operationally configured to electrically communicate with a negative contact 25 and a positive contact 30 within a battery compartment 10 of a corresponding optical sight 5, 6, or 7. As shown, the device 100 may also include a power output insulating ring 129 disposed between the positive terminal 127 and the negative terminal 128.

As shown, the device 100 may comprise a battery compartment cover (hereafter "battery cover 105") operationally configured to threadedly communicate with the main body 101. In another embodiment, the device 100 may be provided without a battery cover 105, and, although a battery cover 105 is not necessarily required for operation of the device 100, a battery cover 105 is operationally configured to promote reliable electrical contact between a coin cell battery 35 and the negative battery contact 125 and positive battery contact 126, prevent unwanted removal of the coin cell battery 35 from the battery compartment 110, and prevent moisture and/or dirt from entering the battery compartment 110. As described below, a battery cover 105 may also comprise one or more secondary positive contacts attached thereto to promote reliable electrical contact of the device 100 with a coin cell battery 35 housed within the battery compartment 110 when the battery cover 105 is threadedly communicated with the main body 101. Referring to FIG. 10, a suitable battery cover 105 of the device 100 comprises a cylindrical neck 122 including a threaded outer surface 106 and a flange 123 as shown. Similar as the one or more raised surfaces 12 described above, a battery cover 105 may also include one or more raised surfaces for ease of finger manipulation when screwing the battery cover 105 on and off of a corresponding battery compartment 110.

In an embodiment, the main body 101 and corresponding battery cover 105 may comprise one or more interrupted thread patterns. In another embodiment, a battery cover 105 may be provided as a flangeless cylindrical member. In another embodiment, the main body 101 of the device 100 may be operationally configured to receive a battery cover 105 in a flush position with respect to the opening of the battery compartment 110.

In an embodiment, the main body 101 and corresponding battery cover 105 may be provided as a snap-on type cover configuration or a quarter-turn type locking cover configuration. In another embodiment, a battery cover 105 may be hingedly attached to the main body 101. In another embodiment, the main body 101 may include a drawer type battery compartment for housing a coin cell battery 35.

With further reference to the embodiment of FIG. 10, the battery compartment 110 of the main body 101 comprises a floor 115 and a first threaded inner surface 116 operationally configured as an attachment surface to threadedly communicate with the threaded outer surface 106 of a corresponding battery cover 105. In another embodiment, a battery cover 15 of an optical sight such as optical sight 5, 6, or 7 may be removed from the optical sight and used as the battery cover 105 for threadedly communicating with the battery compartment 110 of the device 100. In such an embodiment, the first threaded inner surface 116 of the battery compartment 110 suitably comprises a thread pattern and inner diameter like a threaded surface 11 of a battery compartment 10 of an optical sight 5, 6, or 7 from which the battery cover 15 originates.

Figure 13:
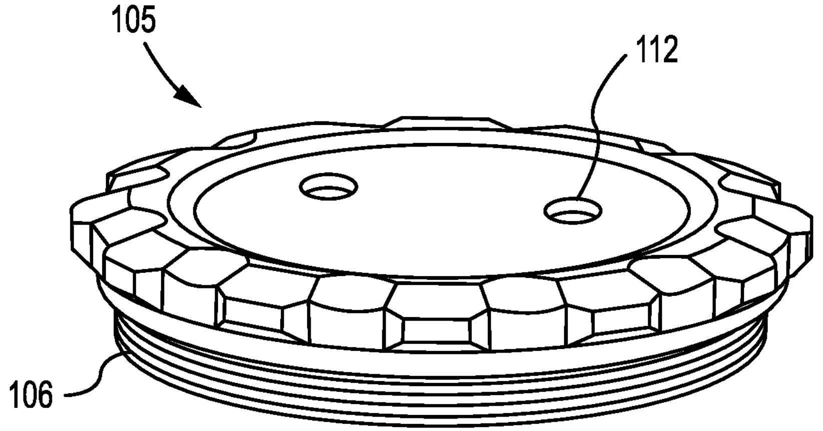
FIG. 13 is a perspective view of an embodiment of a removable battery compartment cover of a coin cell battery powered optical sight as shown in FIGS. 1-3.

Similar as a battery cover 15 as shown in FIGS. 1-4, an outer surface 107 of the battery cover 105 of the device 100 may include one or more surface configurations and at least one slotted surface 119 as described above to assist in turning the battery cover 105 both clockwise and counterclockwise when screwing the battery cover 105 on and off of a corresponding battery compartment 110. In another embodiment, a battery cover 105 of a device 100 may include one or more tooling holes or tooling cavities 112 operationally configured to receive a tool therein to assist in turning the battery cover 105 both clockwise and counterclockwise on and off of a corresponding battery compartment 110 (see FIG. 13).

In another embodiment of a device of this disclosure for use with a host device powered by one or more removable batteries, e.g., one or more coin cell batteries 35, the battery compartment 110 may comprise one or more negative battery contacts 125 and one or more positive battery contacts 126, and the main body 101 may comprise one or more circuitry-controlled positive output contacts 127 and one or more circuitry-controlled negative output contacts 128 that correspond to electrical input contacts of a battery compartment of the host device.

Regarding a device 100 for use with one or more optical sights 5, 6, 7, the control circuitry 109 may include one or more printed circuit boards ("PCB") comprising one or more design specifications including a patterned arrangement of printed circuitry and solid state electronic components mounted to the surface of the PCB. When powered by one or more power sources, e.g., one or more batteries, a PCB of a device 100 of this disclosure may be operationally configured to control or regulate the output power, the output voltage and the rate of electric current of the device 100. At a minimum, a PCB of a device 100 of this disclosure may be operationally configured to feed electrical power at a controlled voltage and a controlled rate to a negative contact 25 and a positive contact ring 30 in a battery compartment 10 of an optical sight 5, 6, or 7 in a manner effective to power the optical sight 5, 6, or 7.

One suitable PCB of a device 100 of this disclosure may include an integrated circuit such as a microcontroller unit ("MCU"), peripheral hardware including one or more input devices and one or more other PCB components for desired operation of a device 100. A MCU of this disclosure may include, but is not limited to a central processing unit ("CPU"), random-access memory ("RAM"), flash memory, a serial bus interface, input/output ports ("I/O Ports"), a special function register ("SFR") for controlling peripheral circuitry, read-only memory ("ROM"), one or more voltage regulator circuits, one or more voltage measurement circuits, and combinations thereof. One or more input devices to implement one or more peripheral functions may include, but are not limited to one or more motion sensors, one or more tilt sensors, one or more light sensors, one or more thermal sensors, one or more image sensors, one or more capacitive touch sensors, one or more biometric sensors, one or more time delay relay circuits, one or more clock circuits, one or more counter circuits, one or more wireless control circuits, one or more analog-to-digital converters, one or more digital-to-analog converters, one or more power regulation circuits, one or more voltage sensors, circuits to perform logic functions, one or more electromagnetic sensors, one or more global positioning system ("GPS") antennas, and combinations thereof. One non-limiting example of an electromagnetic sensor includes a radio frequency sensor ("RF sensor"). Other PCB components may include, but are not limited to one or more resistors, one or more capacitors, one or more inductors, one or more diodes, one or more relays, one or more transistors, and other electrical components as may be required for a particular operation of the device 100 and/or corresponding optical sight 5, 6, or 7. As an example, in an embodiment a PCB may include one or more resistors operationally configured to control output current to a corresponding optical sight 5, 6, or 7, e.g., control the output current for modifying illumination brightness of a reticle of a corresponding optical sight 5, 6, or 7. In an embodiment, a PCB may include one or more variable resistors, e.g., a rheostat, for varying the illumination brightness of a corresponding optical sight 5, 6, or 7.

One or more operating functions that may be added to one or more optical sights 5, 6, 7 via a device 100 comprising control circuitry 109 as described above may include, but are not limited to a motion sensing automatic ON/OFF function, a light sensing function, a thermal sensing function, a shock sensing function, one or more informational digital display functions, a video recording function, an audio recording function, a voice recognition function, a microphone function, an audible speaker function, one or more clock functions, one or more timer functions, one or more illumination functions, e.g., one or more indicator light functions, one or more flashlight functions, one or more wireless connectivity functions, i.e., wire-replacement communications technology, electrical communication port or interface functionality, and combinations thereof. Non-limiting examples of sensor driven control functions that may be added to one or more optical sights 5, 6, 7 via a particular device 100 include (1) battery voltage dependent illumination via one or more battery voltage sensors, (2) inclination-dependent illumination (axial load and/or lateral load) via one or more tilt sensors or one or more accelerometers, (3) ambient light dependent illumination via one or more ambient light sensors and a pulse width modulation ("PWM") brightness control circuit, (4) a shot counter or digital counter using a motion sensor, a shock sensor or an accelerometer, (5) a firearm shot timer using a clock, a shock sensor, a microphone or an accelerometer as a trigger, and an audible speaker, a digital display, one or more LEDs and/or LED arrays, or a wireless connectivity technology to report measured time to a firearm user or other(s), (6) GPS positioning for determining a position of a corresponding device 100 in real time and relay the determined position to one or more remote devices via a wireless connection or via manual download, (7) user authentication based on biometric data and/or password data enabling powering of an optical sight, e.g., illumination of an optical sight reticle once authenticated, (8) direction indication via an electronic compass based on one or more electromagnetic sensors, and combinations thereof. Non-limiting examples of wireless connectivity technology that may be employed for a particular device 100 may include, but are not limited to one or more of radio frequency ("RF") signals, infrared ("IR") radiation wireless technology, Wi-Fi, and Bluetooth® technology, commercially available from Bluetooth SIG, Inc., Kirkland, Washington, U.S.A.

Depending on the one or more operating functions to be added to one or more particular optical sights 5, 6, 7 via a device 100, a main body 101 of a device 100 of this disclosure may include one or more functional components including (1) one or more digital displays, e.g., a GPS positioning display, (2) one or more illumination sources, e.g., one or more LEDs and/or LED arrays, one or more incandescent bulbs, (3) one or more audible speakers, (4) one or more electronic compasses, (5) one or more bubble levels, (6) one or more angle sensors, (7) one or more analog dials, (8) one or more user input components, (9) one or more low battery indicators, e.g., an indicator light, and combinations thereof not otherwise provided on a corresponding optical sight 5, 6, or 7. Non-limiting examples of user input components may include, but are not limited to (1) one or more external manual controls, (2) one or more camera lenses, (3) one or more electrical communication ports or interfaces, (4) one or more microphones, and combinations thereof. Non-limiting examples of one or more external manual controls may include, but are not limited to one or more push buttons, one or more switches, one or more touch screens, one or more touch pads, one or more keypads, one or more touch sensors (capacitive touch sensors and/or resistive touch sensors), one or more biometric security scanners such as fingerprint scanners, face recognition scanners. Non-limiting examples of electrical communication ports include, but are not limited to coaxial inputs, USB ports, ADAT connections, FireWire connections, external power supply connections, e.g., AC power jack inputs, DC power jack inputs, and combinations thereof. Non-limiting examples of USB ports contemplated at the time of this disclosure include, but are not limited to USB Type A, USB Type B, USB Type C, USB 4.0, USB 3.0, USB 2.0, USB Mini, USB Micro, USB Micro B, and combinations thereof. Other known electrical communication ports may be employed as may be desired for one or more particular operations. As understood by the skilled artisan, in time, one or more future electrical communication ports not known at the time of this disclosure may be employed as part of a device 100 of this disclosure. As also understood by the skilled artisan, a PCB layout and/or ornamental design of a particular device 100 may vary according to the one or more operating functions to be added to a particular optical sight 5, 6, or 7 via the device 100. In addition, in an embodiment, the control circuitry 109 logic of the device 100 may be comprised of analog logic elements, digital logic elements, and combinations thereof.

In particular regard to an optical sight 5, 6, or 7 equipped with an illuminated reticle, a device 100 of this disclosure may be operationally configured to modify the illumination circuit performance characteristics of the optical sight 5, 6, or 7 by (1) providing automatic sensor based regulation of illumination brightness of the optical sight 5, 6, or 7 to extend the life of one or more power sources, e.g., one or more batteries, and/or to optimize brightness performance and/or to indicate low battery voltage by flashing illumination, e.g., periodically flashing illumination ON/OFF a number of times to indicate a low battery level when measured voltage falls below a set value corresponding to a battery voltage of 2.2 volts, (2) adding external manual controls to toggle illumination ON/OFF and/or to toggle illumination brightness through two or more brightness levels, (3) providing an optical sight 5, 6, or 7 with one or more additional power sources, e.g., one or more additional batteries, (4) providing an electrical communication port to provide power to the optical sight 5, 6, or 7 via a remote power source, (5) recharging an internal power supply of an optical sight 5, 6, 7, and combinations thereof.

With further reference to the embodiment of FIGS. 10-12, the main body 101 of this embodiment comprises an outer surface 102 including at least a first threaded surface 103 operationally configured to threadedly communicate or otherwise removably attach with a threaded surface 11 of a battery compartment 10. As such, the first threaded surface 103 suitably comprises a thread pattern and outer diameter for operation with battery compartments 10 of one or more optical sights 5, 6, 7. The first threaded surface 103 of this embodiment may be referred to as a "threaded mounting surface" of the device 100.

Figure 14:
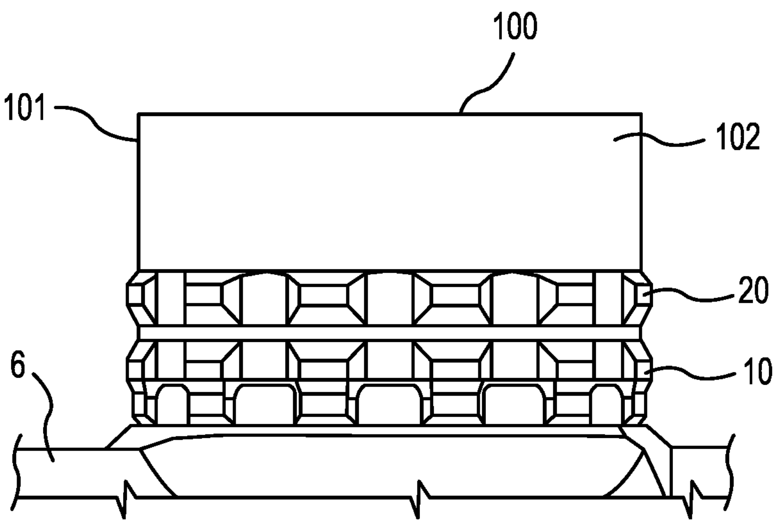
FIG. 14 is a side view of an embodiment of a device of this disclosure.
Figure 15:
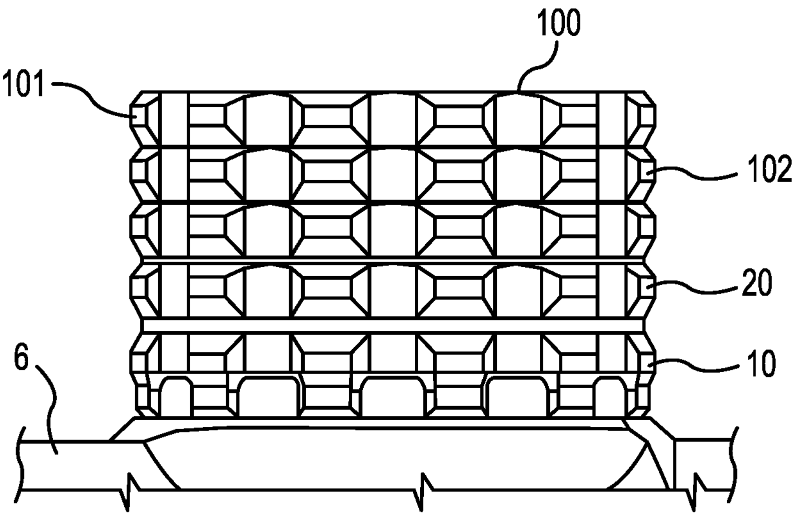
FIG. 15 is a side view of another embodiment of a device of this disclosure.

Once installed onto an optical sight 5, 6, or 7, a main body 101 may comprise an outer diameter the same or substantially similar as the outer diameter of a corresponding battery compartment 10 and/or rotary dial 20 as shown in the non-limiting examples of FIGS. 14 and 15. In another embodiment, the main body 101 may include an outer diameter greater than the outer diameter of a corresponding battery compartment 10 and/or rotary dial 20.

As shown in FIG. 14, in an embodiment an outer surface 102 of the device 100 may include an aesthetically neutral type ornamental exterior appearance for use with a plurality of optical sight battery compartments 10 of varying ornamental exterior surfaces. One non-limiting neutral type surface may include a flat or smooth surface as depicted in FIG. 14. As shown in FIG. 15, in another embodiment a main housing 101 of the device 100 may include a textured outer surface 102 including one or more raised outer surfaces similar as described above providing an ornamental exterior appearance for use with one or more particular optical sights 5, 6, 7. As such, the main housing 101 of the device 100 may include an outer surface 102 in any number of configurations corresponding to one or more particular battery compartments 10 of one or more optical sights 5, 6, 7. In addition, a textured outer surface 102 may assist a user in manually turning the main housing 101 both clockwise and counter-clockwise when screwing the main housing 101 on and off of a corresponding battery compartment 10.

Because a device 100 of this disclosure may be operationally configured for use with one or more commercially available optical sights 5, 6, 7, the battery compartment 110 may be operationally configured to receive the same coin cell battery 35 as used by an optical sight 5, 6, or 7 equipped with the device 100 and/or a like coin cell battery 35 and/or any other type of coin cell battery that is operable with the battery compartment 110. In an embodiment, a battery compartment 110 may comprise a negative battery contact 125 and positive battery contact 126 configuration the same or similar as a battery compartment 10 as depicted in FIGS. 6 and 7. As shown in FIG. 10, the floor 115 of the battery compartment 110 may comprise (1) a negative battery contact 125, e.g., a negative contact plate 125, operationally configured to contact an anode case 40 of a coin cell battery 35 and (2) a positive battery contact 126 along the inner perimeter of the battery compartment 110 operationally configured to contact a cathode case 45 of a coin cell battery 35 in a manner the same or substantially similar as a battery compartment 10 described above. With reference to FIG. 12, the positive terminal 127 and the negative terminal 128 housed in the main body 101 are suitably operationally configured to electrically communicate with a negative contact 25 and a positive contact 30 within a battery compartment 10 of an optical sight 5, 6, or 7 in a manner effective to convey electrical power from the coin cell battery 35 in the battery compartment 110 to the optical sight 5, 6, or 7. Accordingly, in addition to being able to add one or more operating functions to an optical sight 5, 6, or 7, the device 100 is also operationally configured as a substitute battery compartment for an optical sight 5, 6, or 7.

FIGS. 16-23 illustrate an embodiment of a device 100 operationally configured for use with one or more coin cell battery powered optical fights including, but not limited to the one or more optical sights 5, 6, 7. As described above, a device 100 of this embodiment is also operationally configured to add one or more operating functions to one or more optical sights 5, 6, 7 as desired and/or as may otherwise be required for one or more, particular optical sight operations. For purposes of explanation, and not limitation, a device 100 of this embodiment is described below as being operationally configured to add a wake-up system such as a motion sensing automatic ON/OFF function to an optical sight 5, 6, or 7 when the device 100 is electrically communicated with a battery compartment 10 of the optical sight 5, 6, or 7. Herein, a motion sensing automatic ON/OFF function of a device 100 of this disclosure refers to an activation and deactivation function of an illumination source for a reticle of a corresponding optical sight 5, 6, or 7 via the control circuitry 109 of the device 100 without completely powering the control circuitry 109 to a true power OFF position when the illumination source for the reticle is deactivated. For example, the device 100 is operationally configured to maintain an electric current providing a low power idle type setting of the control circuitry 109 of the device 100 when an illumination source for a reticle of a corresponding optical sight 5, 6, or 7 is deactivated to a lowest most illumination setting.

In this embodiment, the device 100 includes a main body 101 and a battery cover 105 operationally configured to threadedly communicate with the main body 101. As shown, the main body 101 comprises an outer surface 102 including at least an outer perimeter surface 111, a first threaded outer surface 103, and a second threaded outer surface 113. The main body 101 also comprises an inner surface 104 including at least a first threaded inner surface 116 and a second threaded inner surface 117. In this embodiment, the main body 101 is operationally configured as a housing for other components of the device 100 including at least a negative terminal 128 (or "negative terminal plunger 128"), a positive terminal 127 (or "positive terminal ring 127"), an insulator 129 (or "insulator ring 129") disposed between the negative terminal 128 and the positive terminal 127, a negative contact spring 132, control circuitry 109 including a PCB 120, a negative battery contact 125 in electrical communication with the PCB 120, e.g., soldered to the PCB 120, and a positive battery contact 126 (or "positive contact ring 126").

Referring to FIGS. 16-19, in an embodiment the negative terminal 128 comprises a cap type member including a sidewall 136 of a first outer diameter, a closed end 135 and an outward annular flange 137 of a second outer diameter greater than the first outer diameter. For purposes of assembly, the negative terminal 128 is disposed within an annular insulator ring 129 comprising an inward annular flange 140 operationally configured to overlap the outward annular flange 137 of the negative terminal 128 in a manner effective to maintain the negative terminal 128 disposed within the annular insulator ring 129. The annular insulator ring 129 further comprises an outward annular flange 141 operationally configured to overlap an inward annular flange 143 of the positive terminal 127. The positive terminal 127 further comprises an outward annular flange 144 operationally configured to overlap a circular projection 145 disposed along the inner surface 104 of the main body 101. When properly assembled, a first side 121 of the PCB 120 is set in abutment with a second side 139 of the positive terminal 127 and a second side 146 of the annular insulator ring 129. In addition, a second side 148 of the PCB 120 acts as a floor for a first side 149 of the positive contact ring 126 and an anode case 40 of a removable coin cell battery 35.

Figure 16:
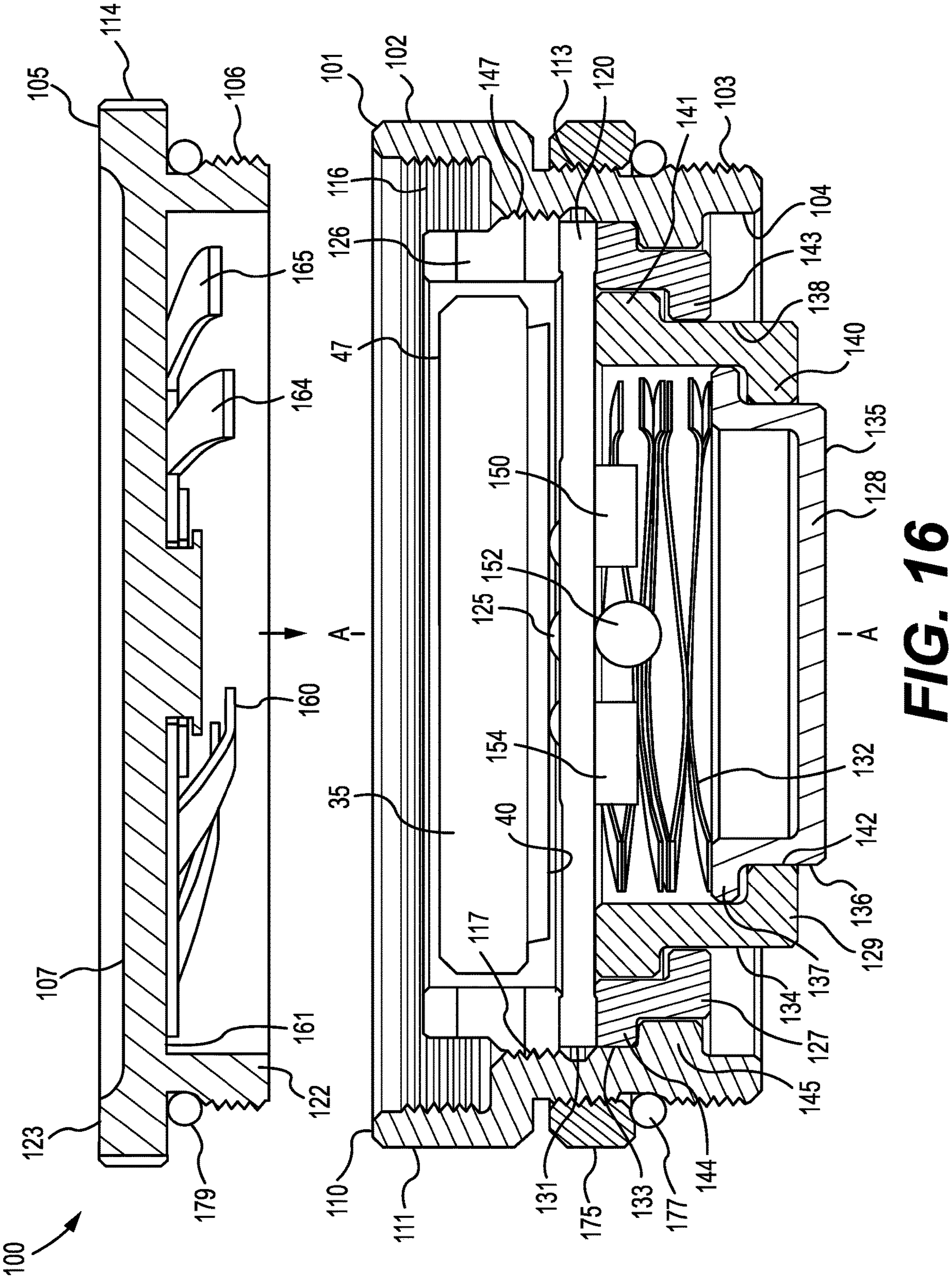
FIG. 16 is a sectional side view of an embodiment of an assembled device of this disclosure depicting a detached battery cover.
Figure 19:
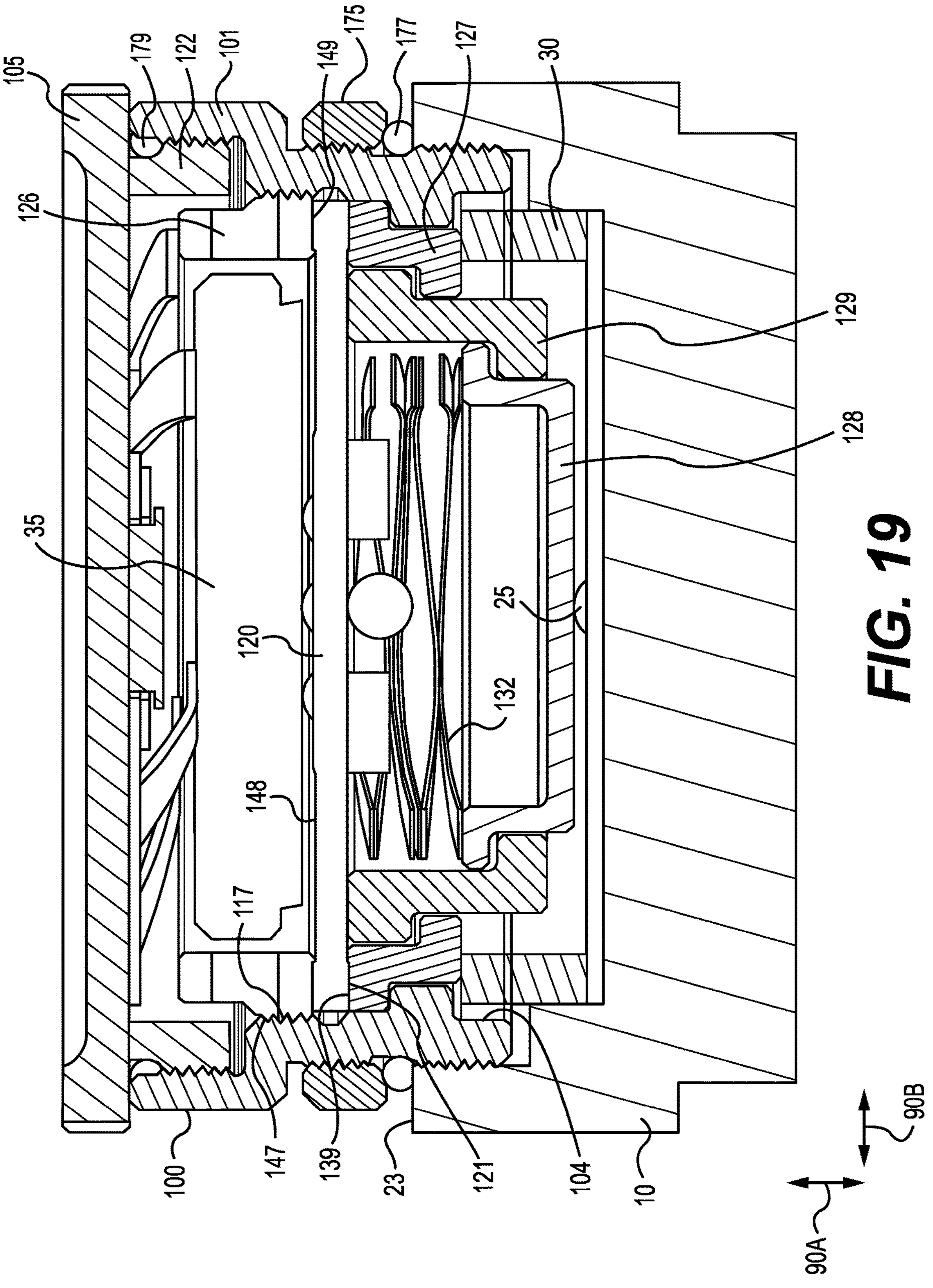
FIG. 19 is a sectional side view of the device of FIG. 16 depicting an attached battery cover.

As shown in FIGS. 16 and 19, the positive contact ring 126 comprises a threaded outer surface 147 operationally configured to threadedly communicate with the second threaded inner surface 117 of the main body 101 in a manner effective to form a close fit of the components assembled within the main body 101 thereby preventing or minimizing linear movement of the components in either direction along the central axis A-A of the device 100 (see directional arrow 90A in FIG. 19) and also provide operable electrical communication between the device 100 and a corresponding battery compartment 10 of an optical sight 5, 6, or 7. As shown, an outer perimeter surface 131 of the PCB 120 and an outer perimeter surface 133 of the positive terminal 127 lie in abutment with the inner surface 104 of the main body 101, an outer perimeter surface 134 of the insulator ring 129 lies in abutment with an inner surface 138 of the positive terminal 127 and the sidewall 136 of the negative terminal 128 lies in abutment with an inner surface 142 of the inward annular flange 140 of the insulator ring 129 thereby preventing or minimizing lateral movement of these components within the main body 101 in either direction (see directional arrow 90B in FIG. 19). In addition, in this embodiment the negative contact spring 132 is suitably biased against the negative terminal 128 and the PCB 120 in a manner effective to prevent or minimize linear and lateral movement of the negative contact spring 132 in either direction according to directional arrows 90A and 90B. Movement of assembled components housed within the main body 101 is limited to any rotational movement that may be realized by one or more of the negative terminal 128 and the insulator ring 129 against the negative contact spring 132. As such, the device 100 of this embodiment is advantageous in that only the positive contact ring 126 is fixed to the inner surface 104 of the main body 101 providing for ease of assembly of the individual components of the device 100. In an embodiment, the positive contact ring 126 may be mechanically fixed to the second threaded inner surface 117 via sufficient torqueing of the positive contact ring 126. Additionally, one or more thread-locking fluids may be applied to the threaded outer surface 147 and/or the second threaded inner surface 117 to adhere the positive contact ring 126 to the inner surface 104 of the main body 101. In another embodiment, it is contemplated that one or more components housed within the main body 101 may be fastened to the inner surface 104 and/or adhered to the inner surface 104 and/or threadedly communicated with the inner surface 104 of the main body 101. In one non-limiting embodiment, one or more components may be fastened to the inner surface 104 of the main body 101 via a keyway coupling or the like.

Figures 17, 18:
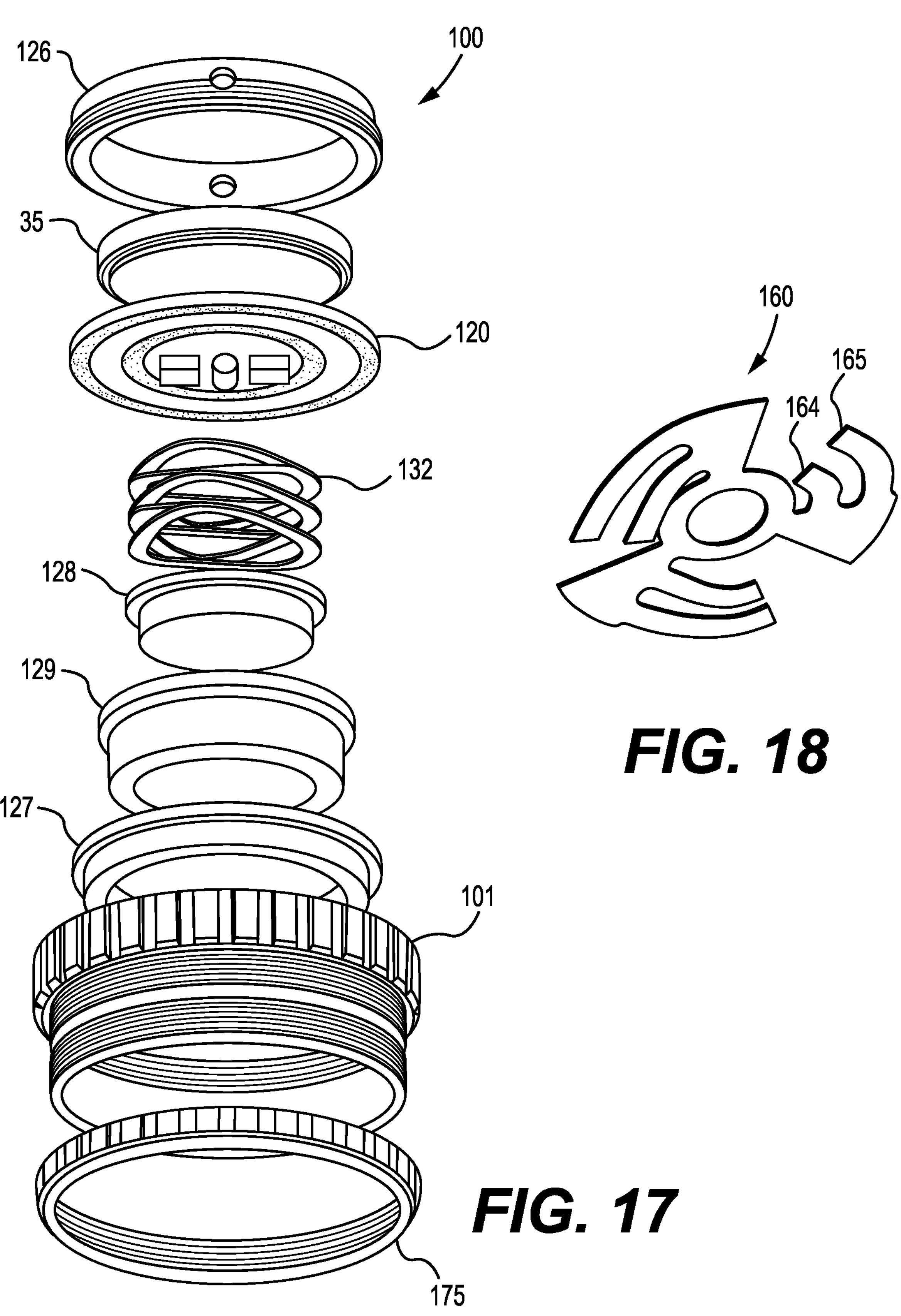
FIG. 17 is an exploded perspective view of the device of FIG. 16.
FIG. 18 is a perspective view of a second positive contact of the battery cover of FIG. 16.

In an embodiment, the PCB 120 may be electrically communicated with a coin cell battery 35 in the battery compartment 110 via the negative battery contact 125 and the positive contact ring 126. As depicted in FIG. 16, the negative battery contact 125 may be disposed on the second side 148 of the PCB 120 in a manner effective for contacting an anode case 40 of a coin cell battery 35 that is housed in the battery compartment 110. Suitably, the positive contact ring 126, which encircles a coin cell battery 35 located in the battery compartment 110, has an inner diameter effective for at least part of an outer perimeter of a cathode case 45 of a coin cell battery 35 to contact the positive contact ring 126 when the coin cell battery 35 is positioned off-center within the positive contact ring 126, i.e., in a scenario where a coin cell battery 35 housed in a battery compartment 110 is not axially aligned with the main body 101. To ensure a positive contact with the cathode case 45, a battery cover 105 of the device 100 may comprise one or more second positive contacts 160 (or "secondary positive contacts 160") suitably attached to an inner surface 161 of the battery cover 105. As shown in FIG. 18, in an embodiment a second positive contact 160 may include at least two sets of contacts, namely, (1) inner contacts ("inner fingers 164") and (2) outer contacts ("outer fingers 165"). When the battery cover 105 is turned to a desired tightened position on the main body 101, the inner fingers 164 are operationally configured to contact an outermost side 47 of the cathode case 45 and the outer fingers 165 are operationally configured to contact the positive contact ring 126. As such, in a scenario where a coin cell battery 35 does not contact the positive contact ring 126, the outer fingers 165 provide a constant positive electrical connection in the battery compartment 110. In an embodiment, a second positive contact 160 may be attached to a battery cover 105 via a retaining clip, a threaded fastener, one or more adhesives, and combinations thereof.

Figure 20:
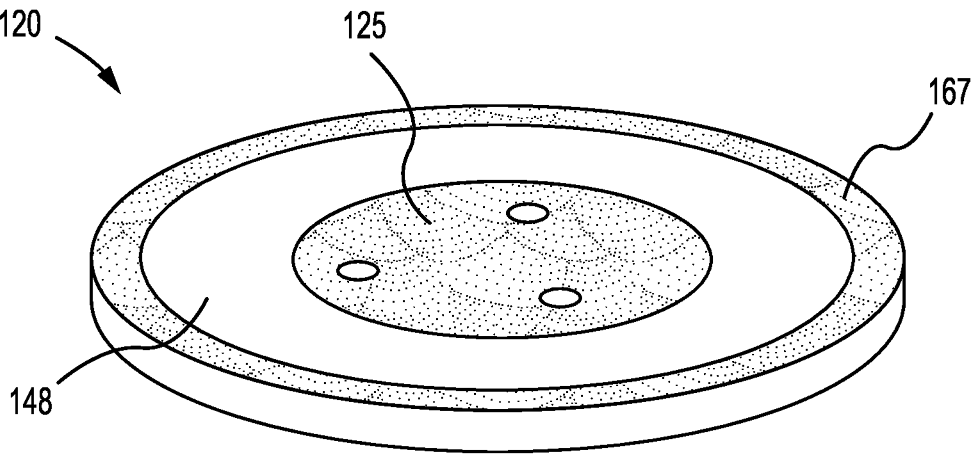
FIG. 20 is a perspective view of a second side of the printed circuit board of FIG. 16.

Referring to FIG. 20, when the device 100 of this embodiment is assembled, the positive contact ring 126 is electrically communicated with the PCB 120 via an exposed contact 167 on the second side 148 of the PCB 120, the exposed contact 167 having a diameter the same or substantially similar as the diameter of the positive contact ring 126 to provide an electrical connection between the exposed contact 167 and the positive contact ring 126 for powering the PCB 120.

Figure 21:
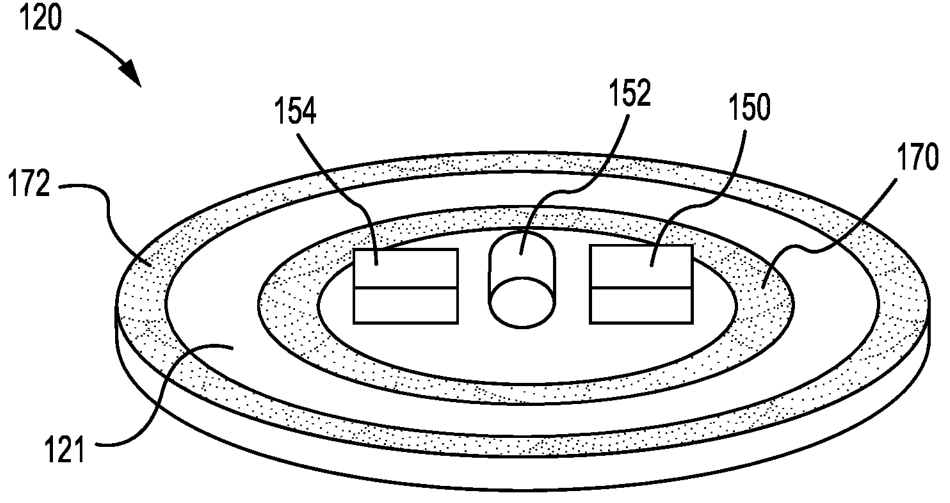
FIG. 21 is a perspective view of a first side of the printed circuit board of FIG. 20.

In this embodiment, the negative contact spring 132 is operationally configured to conduct a current between the PCB 120 and the negative terminal 128. As depicted in FIG. 21, the first side 121 of the PCB 120 comprises an inner circular exposed contact 170 operationally configured to electrically communicate with the negative contact spring 132 when the device 100 is assembled as shown in FIGS. 16 and 19. As depicted in FIG. 19, when assembled the negative contact spring 132 is in electrical communication with the negative terminal 128, which is operationally configured to electrically communicate with a negative contact 25 in a battery compartment 10 of an optical sight 5, 6, or 7. In an embodiment, the negative contact spring 132 may be operationally configured to bias the negative terminal 128 toward a negative contact 25 of an optical sight 5, 6, 7 to insure a proper electrical connection between negative terminal 128 and the negative contact 25 of an optical sight 5, 6, 7.

Figure 22:
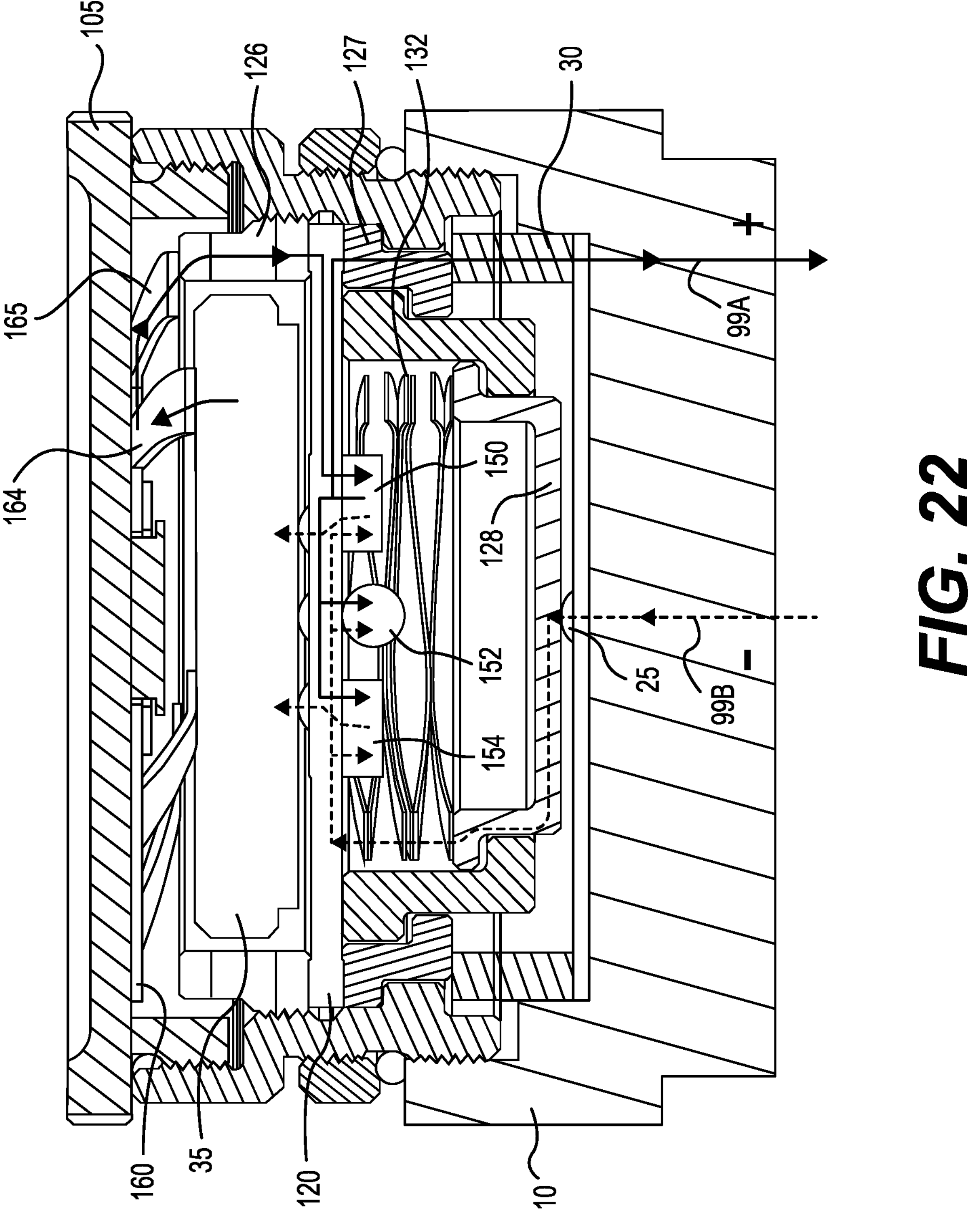
FIG. 22 is another sectional side view of the device of FIG. 16 depicting an attached battery cover.

Referring again to FIG. 21, the first side 121 of the PCB 120 further comprises an outer circular exposed contact 172 operationally configured to electrically communicate with the positive terminal 127, which is operationally configured to electrically communicate with a positive contact 30 in the battery compartment 10 as shown in FIG. 19. FIG. 22 depicts electrical pathways for the device 100 when the device 100 is in electrical communication with a battery compartment 10 of an optical sight 5, 6, or 7 (see current directional arrows 99A and 99B in FIG. 22). In another embodiment, a main body 101 may comprise one or more electrically conductive metals providing one or more electrical pathways for operation of the device 100.

In another embodiment, a positive contact spring may be disposed between the positive contact ring 126 and the exposed contact 167 of the PCB 120 and the sidewall 136 of the negative terminal 128 may extend out a distance effective for operable contact between the annular flange 137 of the negative terminal 128 and the inner circular exposed contact 170 of the PCB 120.

Figure 23:
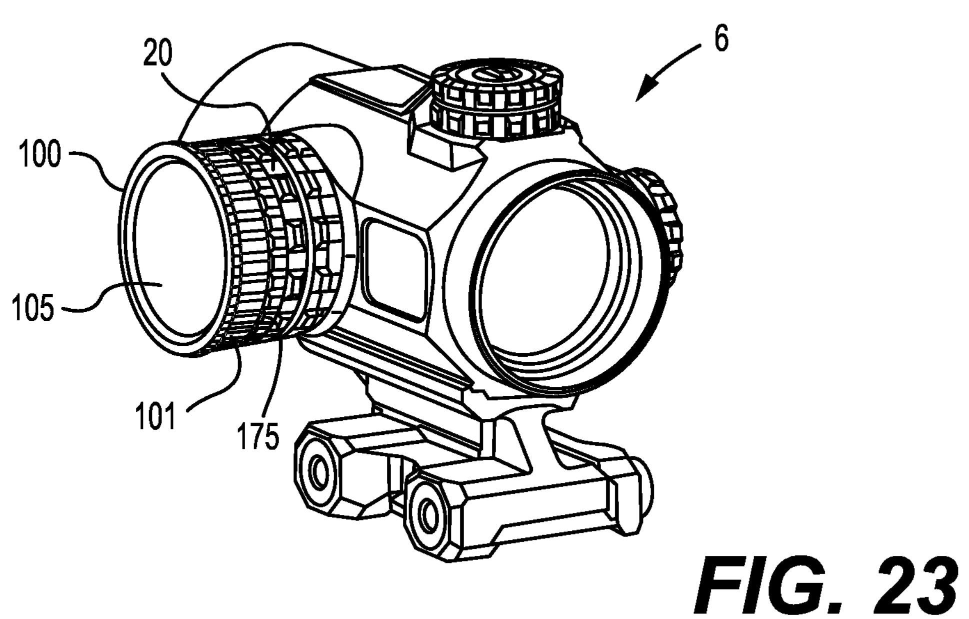
FIG. 23 is a perspective view of the device of FIG. 16 installed on an optical sight.

With particular reference to FIGS. 16, 17 and 19, the device 100 may also include a threaded locking ring 175 operationally configured to threadedly communicate with the second threaded outer surface 113 on the outer surface 102 of the main body 101 in a manner effective to maintain a proper connection between the device 100 and a battery compartment 10 of an optical sight 5, 6, 7 during operation—see the illustration of the device 100 installed on the optical sight 6 in FIG. 23. To prevent moisture and/or dirt from entering the battery compartment 10 of an optical sight 5, 6, 7, the device 100 may also include a first seal 177 operationally configured to form a seal between the locking ring 175, the outer surface 102 and the outer rim 23 of the battery compartment 10 of an optical sight 5, 6, 7 (see FIG. 19). To prevent moisture and/or dirt from entering the battery compartment 110 of the device 100, the device 100 may also include a second seal 179 disposed between the battery cover 105 and the inner surface 104 of the main body 101. In this embodiment, the neck 122 of the battery cover 105 and/or the inner surface 104 of the main body 101 may comprise an angled or groove type surface operationally configured to receive part of the second seal 179 as shown in FIG. 19. Suitable seals 177 and 179 may include, but are not limited to rubber O-rings, rubber annular gaskets, and combinations thereof.

To add a low battery voltage indicating function to an optical sight 5, 6, or 7, one suitable PCB 120 may include voltage-measurement functionality corresponding to battery voltage and one or more other PCB components 154 as described above for desired performance of the control circuitry 109. In an embodiment, a MCU 150 may be programmed to periodically, e.g., for a desired time interval, alternate a ON/OFF condition of the circuitry-controlled electrical output contacts, e.g., the positive terminal 127 and negative terminal 128, a number of times automatically in instances when measured voltage drops below a set value corresponding to a low battery voltage, for example 2.2 volts, indicating to the user the battery is nearly depleted. In a non-limiting example of operation of the accessory 100 with a firearm optical sight, a user will see flashing reticle illumination to indicate to the user that the battery housed within the device 100 is nearly depleted and requires replacement.

To add a motion sensing automatic ON/OFF function to an optical sight 5, 6, or 7, one suitable PCB 120 may include a MCU 150, an input device such as a wake-up system including an accelerometer or motion sensor ("motion sensor 152") mounted to the PCB 120 and one or more other PCB components 154 as described above for desired performance of the control circuitry 109. One suitable motion sensor 152 may comprise a mechanical motion sensor. In an embodiment, a MCU 150 may be programmed to (1) shut to OFF automatically in instances when no motion of the device 100 is detected for a programmed or set period of time, e.g., from or about 10.0 seconds up to or about 60.0 minutes or more via a time delay relay circuit, and (2) turn to ON automatically when the accelerometer or motion sensor 152 detects motion of the device 100 and thus, motion of a corresponding optical sight 5, 6, or 7. For example, one suitable motion sensor 152 may include a motion signal output in electrical communication with a MCU 150 comprising a detection circuit and a wake-up signal output.

Figure 24:
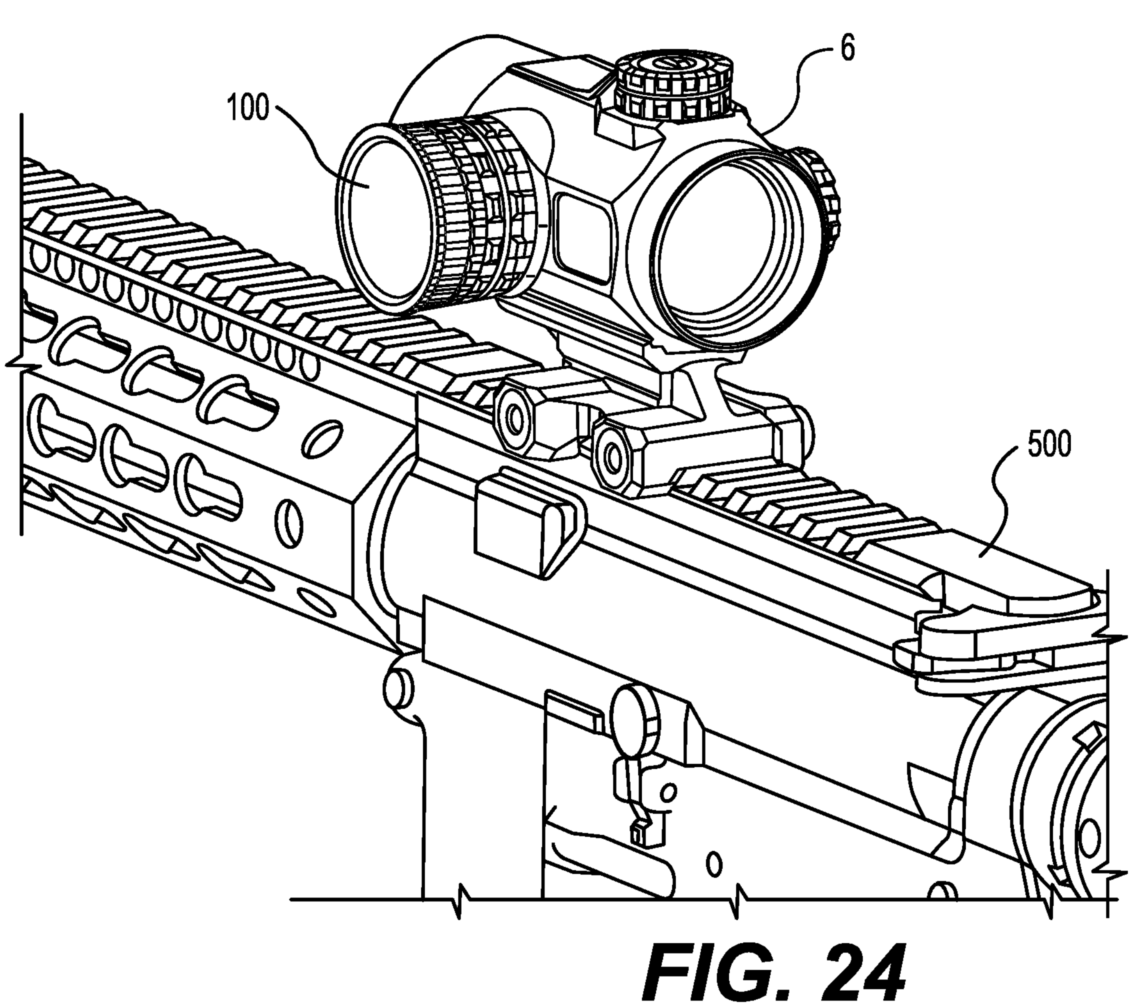
FIG. 24 is a perspective view of the device and optical sight of FIG. 23 with the optical sight mounted to a firearm.

In one exemplary scenario, a device 100 as shown in FIG. 16 comprising a motion sensor 152 may be installed onto an optical sight 6 equipped with an illuminated reticle (see optical sight 6 in FIG. 2) for the purpose of adding a motion sensing automatic ON/OFF function to the optical sight 6. In operation, a user may first remove the battery cover 15 from the battery compartment 10 and then remove a coin cell battery 35 out from the battery compartment 10 if present, exposing the inner surface of the battery compartment 10 as shown in FIG. 6. In one implementation, a user may then install the device 100 onto the battery compartment 10 of the optical sight 6 by screwing the first threaded surface 103 of the device 100 onto the threaded surface 11 of the battery compartment 10 until the device 100 is turned to a desired tightened position on the battery compartment 10. Thereafter, a coin cell battery 35 may be placed into the battery compartment 110 of the device 100 and the battery cover 105 may then be screwed onto the battery compartment 110 enclosing the coin cell battery 35 in the battery compartment 110 thereby installing the device 100 onto the optical sight 6 as shown in FIG. 23. In another implementation, a coin cell battery 35, battery cover 105 and main body 101 may be assembled prior to screwing the device 100 onto the battery compartment 10 of the optical sight 6. In another implementation, a coin cell battery 35 may be held within the battery compartment 110 without including the battery cover 105, e.g., via adhesive tape. In an embodiment, a new or fully-charged coin cell battery 35 may be used as a power source for the device 100 and the optical sight 6. In an embodiment where the battery compartment 10 of the optical sight 6 houses a coin cell battery 35 with remaining charge, such pre-existing coin cell battery 35 may be used as the power source for the device 100 and the optical sight 6. Once the device 100 is installed onto the optical sight 6 and the optical sight 6 is mounted to a firearm 500 as shown in FIG. 24, the device 100 is programmed to automatically deactivate illumination of the optical sight 6 (referred to herein as an "OFF position" of an illuminated reticle of the optical sight 6) in instances when the firearm 500, optical sight 6 and device 100 rest motionless for a programmed period of time, e.g., a period such as 10.0 seconds to 20.0 minutes, by switching the circuit of the control circuitry 109 to an open circuit, i.e., an OFF position, preventing the coin cell battery 35 from being needlessly drained of power, which otherwise may occur in instances where an optical sight 6 without the device 100 maintains an illuminated reticle (referred to herein as an "ON position" of an illuminated reticle of the optical sight 6) for long durations, e.g., several hours or more.

Figure 25:
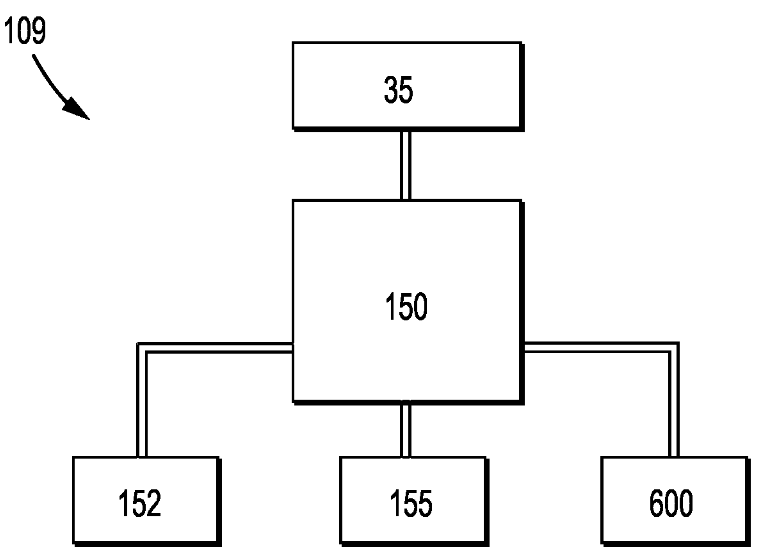
FIG. 25 is an electrical block diagram of control circuitry of a device of this disclosure.
Figure 26:
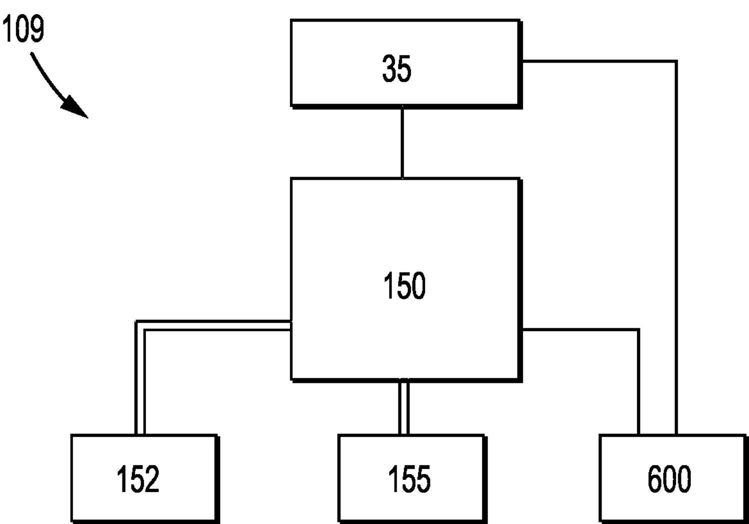
FIG. 26 is an electrical block diagram of control circuitry of a device of this disclosure.

FIG. 25 is a simplified electrical block diagram of an embodiment of control circuitry 109 of a device 100 as described in reference to FIG. 16 including a motion sensor 152 and a MCU 150 comprising a time delay relay circuit 155 in parallel with an existing illumination circuit 600 of a corresponding optical sight 5, 6, or 7. FIG. 26 is a simplified electrical block diagram of an embodiment of control circuitry 109 of the device 100 as described in reference to FIG. 16 including a motion sensor 152 and a MCU 150 comprising a time delay relay circuit 155 in series with an existing lighting circuit 600 of a corresponding optical sight 5, 6, or 7.

A device 100 as described in reference to FIGS. 16-23 may be built to scale and designed as desired or as may otherwise be required for operation with one or more particular optical sights 5, 6, 7. Without limiting the device 100 to a particular embodiment, one exemplary device 100 suitable for use with one or more optical sights including one or more optical sights 5, 6, 7 described above may include a main body 101 and battery cover 105 with dimensions as listed in Table 3.

TABLE 3

| | Dimension |
|---|---|
| (1) Main Body 101 | |
| Outer Diameter at the Outer Surface 102 | from or about 25.0 mm to or about 35.0 mm |
| Outer Diameter at the First and Second Threaded Outer Surfaces 103 and 113 | from or about 20.0 mm to or about 30.0 mm |
| Height | from or about 5.0 mm to or about 15.0 mm |
| (2) Battery Cover 105 | |
| Outer Diameter at the Neck 122 | from or about 20.0 mm to or about 30.0 mm |
| Outer Diameter of Flange 123 at Outer Perimeter 114 | from or about 25.0 mm to or about 35.0 mm |
| Height of Flange 123 at Outer Perimeter 114 | from or about 0.0 mm to or about 10.0 mm |
| Height of Cylindrical Neck 122 | from or about 2.0 mm to or about 10.0 mm |

In another exemplary embodiment of a device 100 operationally configured for use with a micro red dot optical sight, for example, the Aimpoint® T-1 micro red dot scope commercially available from Aimpoint AB, located in Malmo, Sweden, a main body 101 of the device 100 includes the dimensions as listed in Table 4.

TABLE 4

| Main Body 101 | Dimension |
|---|---|
| Outer Diameter at the Outer Surface 102 | 26.0 mm |
| Outer Diameter at the First and Second Threaded Outer Surfaces 103 and 113 | 25.0 mm |
| Height | 11.5 mm |

In an embodiment, a device 100 may be provided as an OE component of an optical sight including, but not limited to optical sights 5, 6, 7 described above. In another embodiment, a device 100 may be provided as an aftermarket item operationally configured for use with one or more existing optical sights, including, but not limited to the optical sights 5, 6, 7 described above. As such, a device 100 of this disclosure may include any number of ornamental outer surface features corresponding to one or more existing optical sights, including, but not limited to optical sights 5, 6, 7. Although an OE battery cover 105 may be provided as part of the device 100, the use of a battery cover 15 of a corresponding optical sight 5, 6, or 7 may be desired in some embodiments for purposes of aesthetic uniformity of the optical sight 5, 6, or 7.

As understood by the skilled artisan, optical sights are often provided in colors including (1) black, (2) silver, (3) army green or olive drab ("OD") green, a color often referred to as "flat dark earth," (4) one of a plurality of camouflage patterns, and combinations thereof. As such, a device 100 of this disclosure may include a main body 101 and/or battery cover 105 having an exterior surface comprising any color, color combination or pattern including one or more of the above listed colors or a particular camouflage pattern for use with one or more particular color or camouflage patterned optical sights, including one or more particular optical sights 5, 6, 7 described above.

Common commercially available optical sights 5, 6, 7 for projectile launching devices, including the battery compartments 10, rotary dials 20 and battery covers 15 of such, are typically constructed of one or more materials resistant to chipping, cracking, excessive bending and reshaping as a result of ozone, weathering, heat, moisture, other outside mechanical and chemical influences, as well as various impacts and other loads that may be placed on an optical sight 5, 6, 7. Common materials of construction for one or more optical sights 5, 6, 7 include one or more metals, one or more plastics, one or more composite materials, and combinations thereof. Exemplary metals include machined metal or cast metal including aluminum, anodized aluminum, steel, various alloys, titanium, one or more electrically conductive metals, and combinations thereof. Also, a battery compartment 10 constructed from one or more metals may include a chrome-plated surface finish as desired. Exemplary electrically conductive metals may include, but are not limited to silver, copper, gold, aluminum, zinc, nickel, chromium, and combinations thereof. Exemplary plastics used in optical sight construction include one or more injection molded polymers. Exemplary composite materials include, but are not limited to glass-filled polymer, e.g., glass-filled nylon. As such, the main body 101 and/or battery cover 105 of a device 100 of this disclosure may be constructed from one or more of the above described materials including the same or similar material(s) as one or more particular optical sight battery compartments 10. In one non-limiting embodiment of the device 100, the main body 101 may be constructed of aluminum, the battery cover 105 may be constructed of aluminum, the negative terminal 128 may be constructed of plated steel, the insulator ring 129 may be constructed of nylon plastic, the positive terminal 127 may be constructed of plated aluminum, the negative contact spring 132 may be constructed of plated stainless steel, the negative battery contact 125 may be constructed of plated stainless steel, the positive contact ring 126 may be constructed of plated aluminum, the second positive contact 160 may be constructed of plated stainless steel, and the exposed contacts 167, 170, and 172 of the PCB 120 may comprise gold-plated copper trace. In one non-limiting embodiment, the conductor parts of the device 100 may be plated with electroless nickel.

Figure 27:
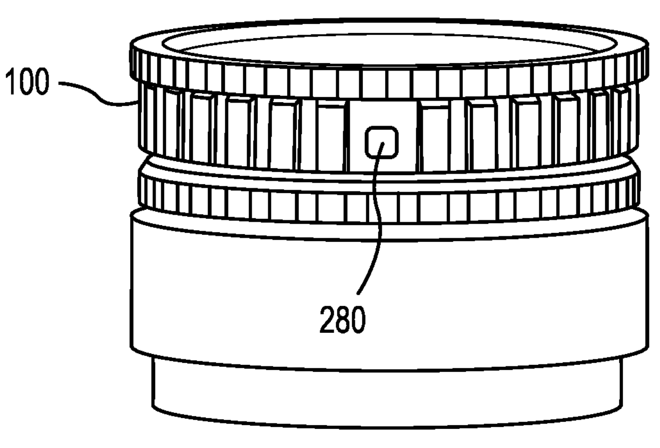
FIG. 27 is a perspective view of a device of this disclosure comprising a user input component including a push button.
Figure 28:
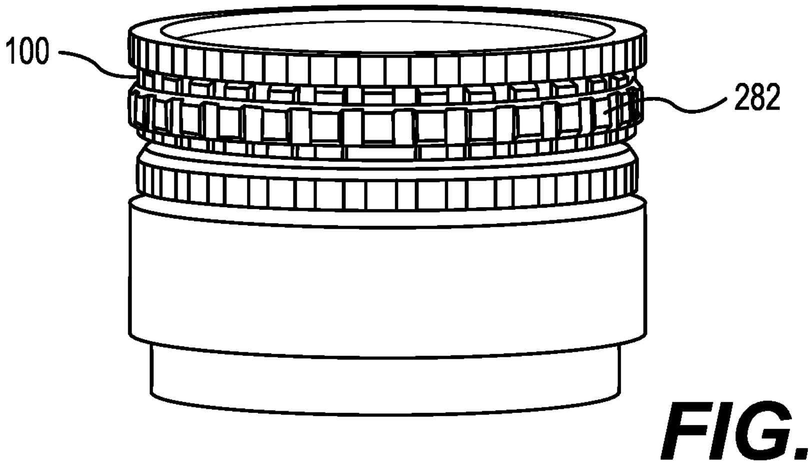
FIG. 28 is a perspective view of a device of this disclosure comprising a user input component including a switch in the form of a rotary dial switch.
Figure 29:
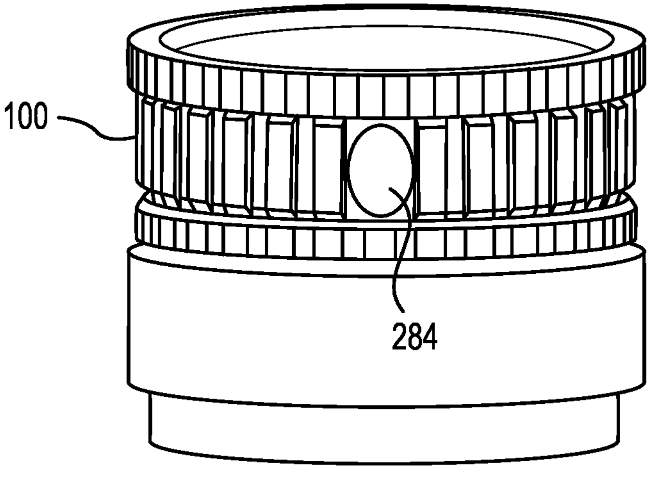
FIG. 29 is a perspective view of a device of this disclosure comprising a user input component including a biometric security scanner.

FIGS. 27-29 provide non-limiting examples of a device 100 of this disclosure operationally configured for use with a coin cell battery compartment 10 of one or more optical sights including one or more optical sights 5, 6, 7 described above, the device 100 comprising one or more user input components. For example, FIG. 27 illustrates an embodiment of a device 100 comprising at least one user input component comprising a push button 280. FIG. 28 illustrates an embodiment of a device 100 comprising at least one user input component comprising a switch 282 in the form of a rotary dial switch. FIG. 29 illustrates an embodiment of a device 100 comprising at least one user input component comprising a biometric security scanner 284. The embodiments of FIGS. 27-29 each comprise control circuitry 109 with design specifications effective for performance of particular add-on operating functions according to the one or more user input components. As understood by the skilled artisan, control circuitry 109 design specifications may vary based on the one or more user input components included and one or more add-on operating functions for a particular device 100.

In addition to operation with an optical sight for one or more projectile launching devices, it is also contemplated that a device 100 of this disclosure may be operationally configured for use with one or more other devices comprising removable batteries or other removable power sources including, but not limited to one or more radios, one or more hand held communication devices, one or more cameras, one or more rangefinders, one or more night vision weapon sights, one or more flashlights, one or more laser pointers, one or more headphones, one or more medical devices, one or more toys, one or more remote controls, one or more key fobs, one or more holiday ornaments, and one or more flameless candles.

Figure 30:
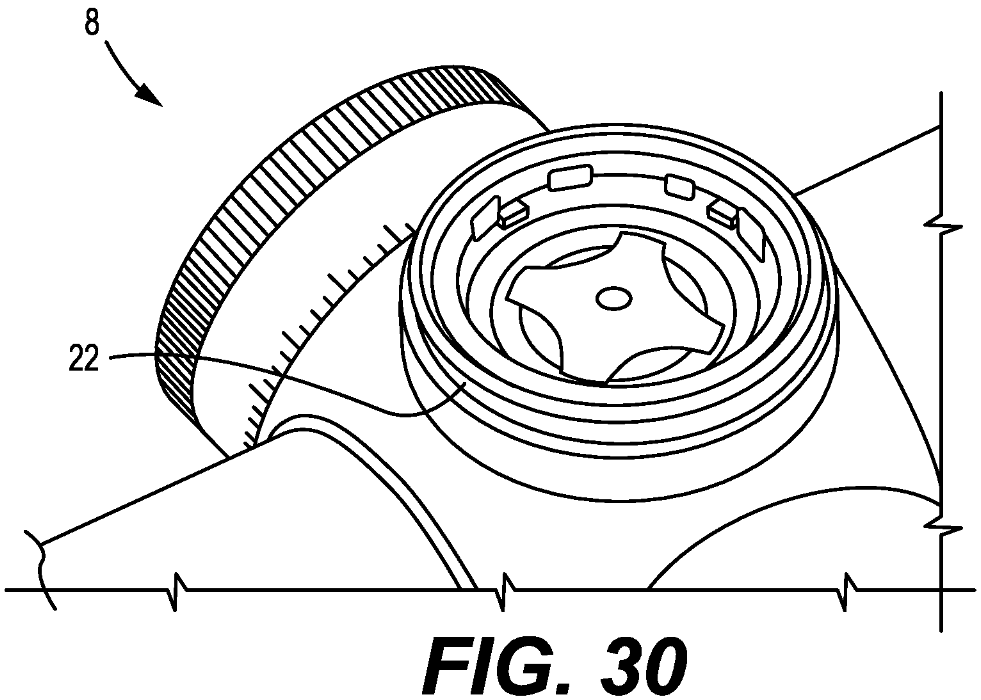
FIG. 30 is a perspective view of part of a coin cell battery powered optical sight commercially available at the time of this disclosure with an empty battery compartment exposing an inner surface of the battery compartment.

With reference to FIG. 30, in another embodiment a device 100 of this disclosure may be operationally configured for use with an optical sight 8 similar as optical sights 5, 6, 7 but having a battery compartment 10 with an outer threaded surface 22 for receiving an inner threaded surface of a corresponding battery cover 15. In this embodiment, the main body 101 of the device 100 suitably comprises an inner threaded surface operationally configured to threadedly communicate with the outer threaded surface 22 of battery compartment 10.

Figure 31:
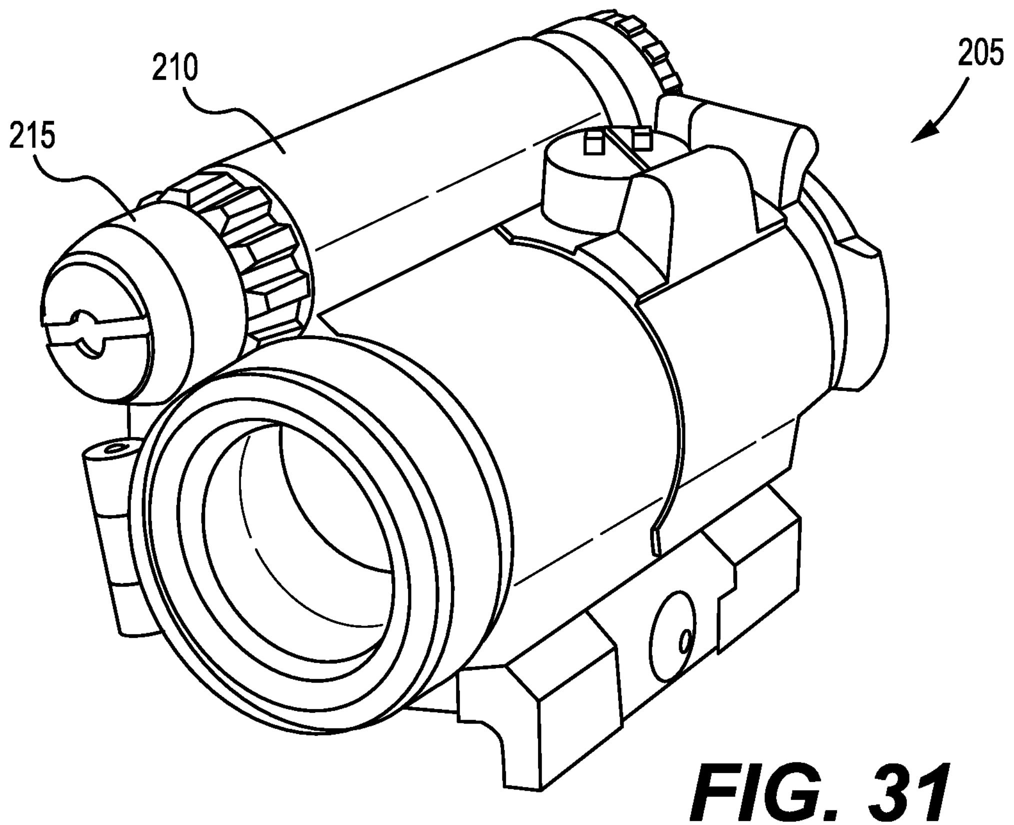
FIG. 31 is a perspective view of an optical sight comprising a cylindrical type battery compartment for housing a cylindrical battery.

In still another embodiment, a device of this disclosure may also be operationally configured for use with one or more optical sights comprising an elongated cylindrical type battery compartment. One non-limiting example of an optical sight comprising a cylindrical type battery compartment includes the Aimpoint® 9000SC-NV™ 2 MOA—Red Dot Reflex Sight commercially available from Aimpoint AB, located in Malmo, Sweden. Another non-limiting example of an optical sight 205 comprising an elongated cylindrical type battery compartment for housing a cylindrical battery is described in U.S. Pat. No. 9,939,229 B2, titled "Gun Scope with Battery Compartment," published on Apr. 10, 2018, which is herein incorporated by reference in its entirety. Another non-limiting example of an optical sight comprising a cylindrical type battery compartment is shown in FIG. 31, hereafter referred to generally as "optical sight 205." As described below, a device 200 of this embodiment is operationally configured to electrically communicate with a cylindrical battery 295 housed in a cylindrical type battery compartment 210 of an optical sight 205 in a manner effective to add one or more operating functions to the optical sight 205.

Figure 32:
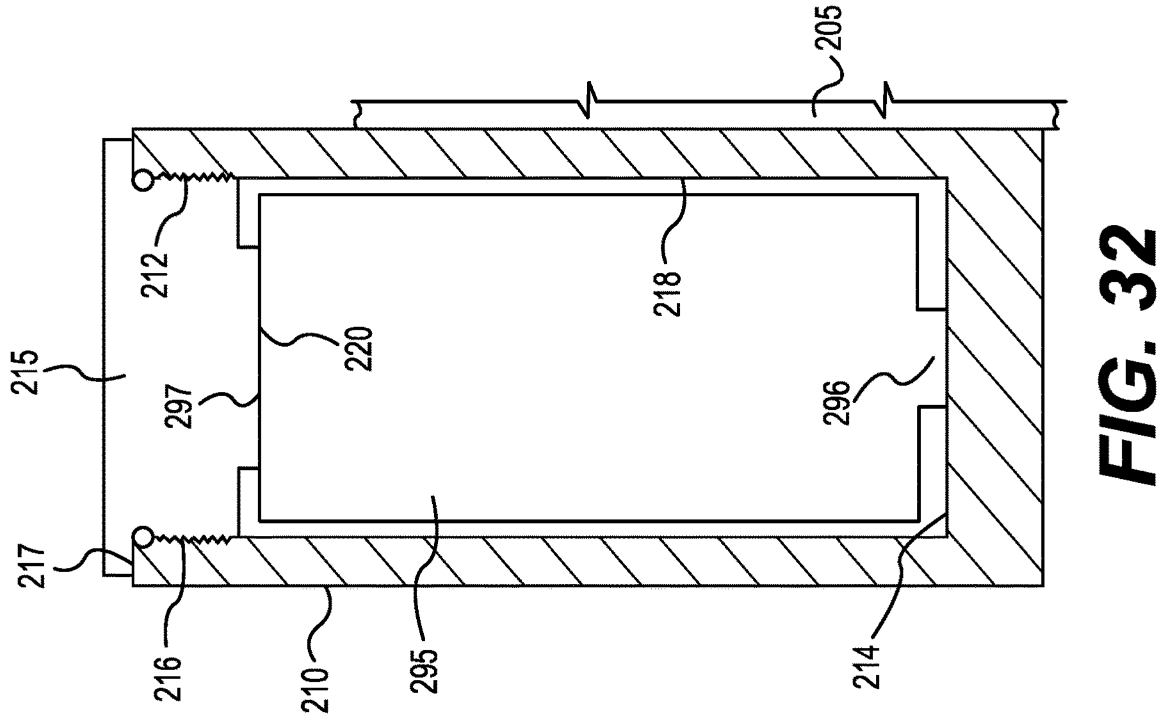
FIG. 32 is a sectional side view of a cylindrical type battery compartment of an optical sight.

Referring to FIG. 32, a common cylindrical type battery compartment 210 includes (1) an open end with a threaded inner surface 212 for threaded communication with a threaded surface 216 of a battery cover 215, (2) a closed end comprising a positive contact 214 for making an electrical connection with a raised positive terminal 296 of a cylindrical battery 295 as shown, and (3) a cylindrical sidewall inner surface 218 disposed there between. As understood by persons of ordinary skill in the art, the battery cover 215 includes a negative contact 220 operationally configured to make an electrical connection with a negative terminal 297 of the cylindrical battery 295 when the battery cover 215 is threaded onto the battery compartment 210 as shown.

Figure 33:
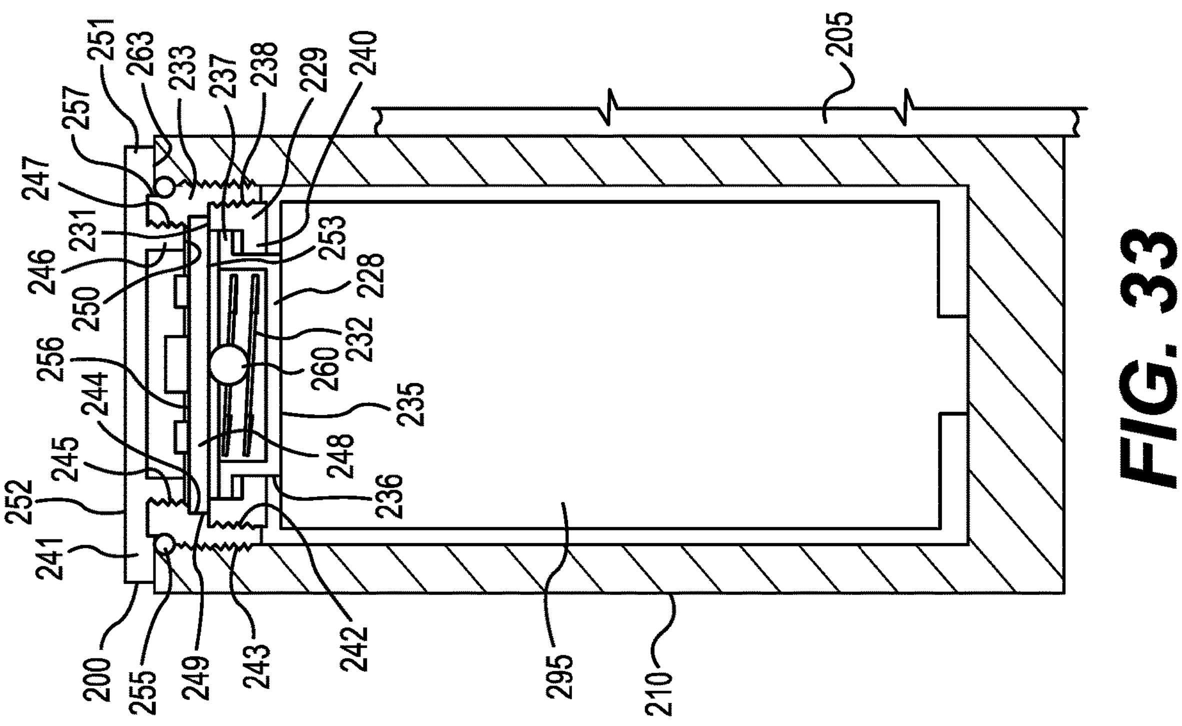
FIG. 33 is a sectional side view of the cylindrical type battery compartment of FIG. 32 including an embodiment of a device of this disclosure attached thereto.

Referring to FIG. 33, in an embodiment, the device 200 may be operationally configured as a substitute battery cover for a battery compartment 210 of an optical sight 205 and operationally configured to add one or more operating functions to the optical sight 205. In another embodiment, the device 200 may be provided as an OE battery cover of a battery compartment 210 for an optical sight 205.

In an embodiment, the device 200 may be provided as an assembly comprising (1) a negative contact 228, (2) a negative contact spring 232, (3) an insulator ring 229, (4) an annular negative terminal 233, (4) control circuitry including at least one PCB 248, and (5) an outer cover 241. In this embodiment, the negative contact 228 is provided as a cap type member comprising a sidewall 236 of a first outer diameter, a closed end 235 and an outward annular flange 237 of a second outer diameter greater than the first outer diameter. For purposes of assembly, the negative contact 228 is disposed within an annular insulator ring 229 comprising an inward annular flange 240 operationally configured to overlap the outward annular flange 237 in a manner effective to maintain the negative contact 228 disposed within the insulator ring 229. The insulator ring 229 further comprises an outer threaded surface 238 operationally configured for threaded communication with a first inner threaded surface 242 of the negative terminal 233. The negative terminal 233 includes an outer threaded surface 243 operationally configured for threaded communication with threaded inner surface 212 of the battery compartment 210. The negative terminal 233 also comprises a second inner threaded surface 245 operationally configured for threaded communication with an outer threaded surface 247 of a cylindrical neck 246 of the outer cover 241.

The inner surface of the negative terminal 233 further includes a non-threaded surface 244 disposed between the first inner threaded surface 242 and the second inner threaded surface 245 operationally configured as an abutment surface or seat for an outer perimeter surface 249 of the PCB 248. Although the non-threaded surface 245 is not limited to a particular configuration, as shown in FIG. 33 the non-threaded surface 245 may be provided as a right angle surface effective as an abutment surface for the outer perimeter surface 249 and a second side of the PCB 248.

When properly assembled, the closed end 235 of the negative contact 228 lies in abutment with the negative terminal 297 of the cylindrical battery 295 and a first side 253 of the PCB 248 lies in abutment with a second side 231 of the insulator ring 229. In addition, a second side 256 of the PCB 248 is operationally configured as an abutment surface for an inner surface 250 of the outer cover 241. In another embodiment, an assembled device 200 may include a space between the inner surface 250 of the outer cover 241 and the second side 256 of the PCB 248.

In this embodiment, the outer cover 241 includes a flange 251 with a first side 263 operationally configured to abut an outer perimeter surface 217 at the open end of the battery compartment 210. To prevent moisture and/or dirt from entering the battery compartment 210 of the device 200, the device 200 may also include a seal 255 disposed between the flange 251 of the outer cover 241, the inner surface 218 of battery compartment 210, and an outer surface 257 of the negative terminal 233 as shown in FIG. 33. In this embodiment, the outer surface 257 of the negative terminal 233 comprises an angled surface operationally configured to receive part of the seal 255 as shown. In another embodiment, an outer surface 257 may include a groove or slot type surface. A suitable seal 255 includes, but is not limited to a rubber O-ring, a rubber annular gasket, and combinations thereof.

In another embodiment, the outer cover 241 may be provided as a raised flangeless cylindrical member or as a flangeless cylindrical member that lies flush or substantially flush with the outer perimeter surface 217 of the battery compartment 210. In addition, an outer surface 252 of the outer cover 241 may include one or more slotted surfaces similar as the one or more slotted surfaces 119 as shown in FIG. 10 and/or tooling cavities similar as the tooling cavities 112 shown in FIG. 13 to assist in turning the device 200 both clockwise and counter-clockwise when screwing the device 200 on and off of a corresponding battery compartment 210.

Suitably, a device 200 of this embodiment is operationally configured to add one or more operating functions to an optical sight 205 when the device 200 is in electrical communication with a cylindrical battery 295 housed in a battery compartment 210 of an optical sight 205 for powering the PCB 248. The one or more operating functions to be added to an optical sight 205 may comprise one or more operating functions as described above in discussion of device 100. For example, in an embodiment a device 200 may be operationally configured to add a motion sensing automatic ON/OFF function to an optical sight 205 for operation as described above when the device 200 is electrically communicated with a battery compartment 210 as shown in FIG. 33. In such an embodiment, a PCB 248 may comprise a MCU as described above, a motion sensor 260 and one or more other PCB components 154 as described above for desired performance of the control circuitry of the device 200. In addition, the PCB 248 may include a circular exposed contact similar as the inner circular exposed contact 170 described above that is operationally configured to electrically communicate with the negative contact spring 232 biased against both the negative contact 228 and the exposed contact on the PCB 248 when the device 200 is assembled as shown. In operation, the other part of a circuit of the device 200 is achieved through the battery compartment 210, e.g., the threaded inner surface 212 or other contact surface of the negative terminal 233.

A device 200 of this embodiment may be constructed of one or more materials as described above and include one or more colors, color combinations, patterns and/or surface finishes as described above in relation to device 100. In one non-limiting embodiment of the device 200, a negative contact 228 may be constructed of plated aluminum, a negative contact spring 232 may be constructed of plated stainless steel, an insulator ring 229 may be constructed of nylon plastic, a negative terminal 233 may be constructed of gold plated copper, and an outer cover 241 may be constructed of anodized aluminum.

In another embodiment where the device 200 is provided as part of an OE optical sight, the device 200 may be provided as a snap-on type cover configuration or a quarter-turn type locking cover configuration.

In still another embodiment, a device 200 may be provided comprising a configuration the same or similar as a battery cover 215 as shown in FIG. 32 wherein a negative contact and control circuitry, e.g., at least one PCB 248, are secured to an inner surface of the device 200 (similar as the location of the negative contact 220 in FIG. 32).

The disclosure will be better understood with reference to the following non-limiting examples, which are illustrative only and not intended to limit the present disclosure to a particular embodiment.

Example 1

In a first non-limiting example, a device 100 of this disclosure as discussed in reference to FIGS. 10-29 may be operationally configured for use with one or more optical sights as described in U.S. Pat. No. 10,488,156 B2, titled "Optical System Accessory with Cant Indication," published on Nov. 26, 2019, which is herein incorporated by reference in its entirety; U.S. Pat. No. 9,982,965 B2, titled "Inner Red-Dot Gun Sighting Device Powered by Solar Cell and Provided with Micro-Current LED Light Source," published May 29, 2018, which is herein incorporated by reference in its entirety; U.S. Pat. No. 9,316,460 B2, titled "One Hand Operational Combo Sight Device," published on Apr. 19, 2016, which is herein incorporated by reference in its entirety; and United States Patent Application Publication Number US 2021/0247163 A1, titled "Telescopic Sight Having Ballistic Group Storage," published on Aug. 12, 2021, which is herein incorporated by reference in its entirety.

Example 2

Figure 34:
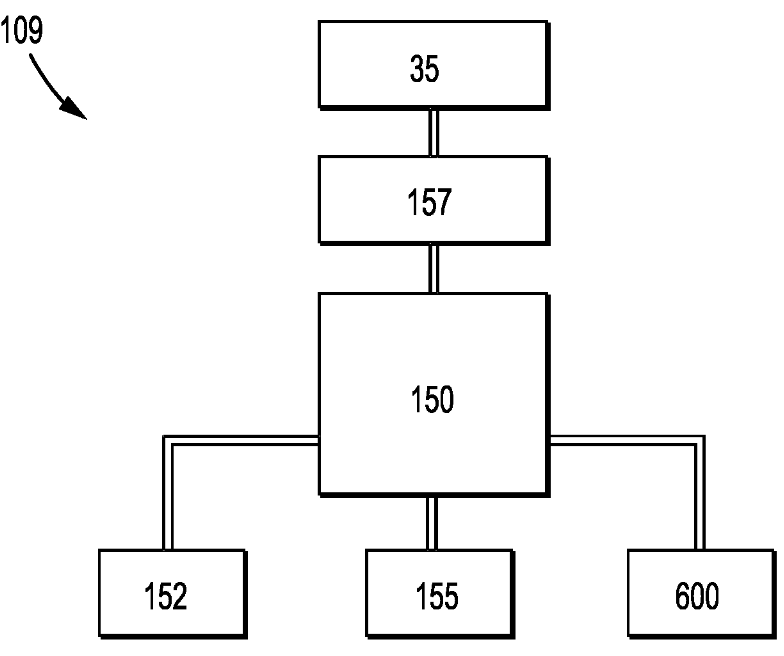
FIG. 34 is an electrical block diagram of control circuitry of a device of this disclosure.

In a second non-limiting example, a simplified electrical block diagram is provided in FIG. 34 depicting an embodiment of control circuitry 109 of a device 100 as described in reference to FIG. 16 including a motion sensor 152 and a MCU 150 comprising a time delay relay circuit 155 and a battery voltage measurement circuit 157 in parallel with an existing illumination circuit 600 of a corresponding optical sight 5, 6, or 7.

Example 3

Figure 35:
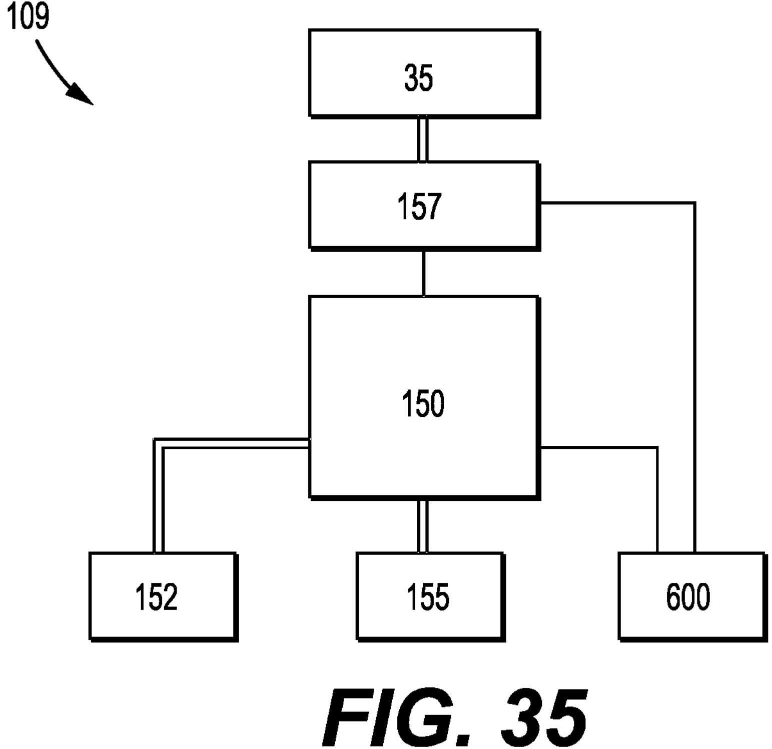
FIG. 35 is an electrical block diagram of control circuitry of a device of this disclosure.

In a third non-limiting example, a simplified electrical block diagram is provided in FIG. 35 depicting an embodiment of control circuitry 109 of the device 100 as described in reference to FIG. 16 including a motion sensor 152 and a MCU 150 comprising a time delay relay circuit 155 and a battery voltage measurement circuit 157 in series with an existing lighting circuit 600 of a corresponding optical sight 5, 6, or 7.

Although the present disclosure is described in terms of various exemplary embodiments and implementations, it should be understood that the various features and functionality described in one or more of the individual embodiments are not limited in their applicability to the particular embodiment with which they are described, but instead might be applied, alone or in various combinations, to one or more other embodiments whether or not such embodiments are described and whether or not such features are presented as being a part of a described embodiment. Thus, the breadth and scope of the claimed invention should not be limited by any of the embodiments described herein.

Terms and phrases used in this disclosure, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," "one or a plurality" or the like.

Embodiment 1

An accessory for use with a battery powered device, comprising:

(a) a battery compartment, the battery compartment comprising electrical input contacts;

(b) control circuitry in electrical communication with the electrical input contacts; and (c) circuitry-controlled electrical output contacts;

(d) wherein when the accessory is in electrical communication with a power source and when the accessory is in electrical communication with the battery powered device, then the control circuitry is operationally configured to add one or more operating functions to the battery powered device.

Embodiment 2

The accessory of Embodiment 1, wherein when the battery compartment is in electrical communication with one or more batteries and wherein when the accessory is in electrical communication with a battery powered device battery compartment, then the control circuitry is operationally configured to add one or more operating functions to the battery powered device.

Embodiment 3

The accessory of Embodiment 2, wherein the accessory comprises a main body removably attachable to the battery powered device battery compartment, wherein when the accessory is in electrical communication with the battery powered device battery compartment, then the circuitry-controlled electrical output contacts are in electrical contact with battery powered device battery compartment electrical input contacts.

Embodiment 4

The accessory of Embodiment 1, wherein when one or more removable batteries are located within the battery compartment, wherein when the electrical input contacts are in electrical communication with the one or more removable batteries, and wherein when the circuitry-controlled electrical output contacts are in electrical contact with battery powered device battery compartment electrical input contacts, then the control circuitry is operationally configured to add one or more operating functions to the battery powered device.

Embodiment 5

The accessory of Embodiment 1, wherein when the battery compartment is in electrical communication with one or more batteries and wherein when the accessory is in electrical communication with a coin cell battery compartment of the battery powered device, then the control circuitry is operationally configured to add one or more operating functions to the battery powered device.

Embodiment 6

The accessory of Embodiment 1, wherein when the accessory is in electrical communication with the coin cell battery compartment of the battery powered device, then the circuitry-controlled electrical output contacts are in electrical contact with battery powered device battery compartment electrical input contacts.

Embodiment 7

The accessory of Embodiment 1, wherein the control circuitry includes one or more motion sensors, one or more timers, one or more time delay relay circuits, one or more power regulation circuits, and combinations thereof.

Embodiment 8

The accessory of Embodiment 7, wherein the one or more operating functions comprise a motion sensing automatic ON/OFF power function.

Embodiment 9

The accessory of Embodiment 7, wherein the control circuitry is operationally configured to deactivate the circuitry-controlled electrical output contacts after a set period of accessory non-motion is realized setting the accessory to an OFF position and wherein the control circuitry is operationally configured to activate the circuitry-controlled electrical output contacts when the control circuitry detects accessory motion.

Embodiment 10

The accessory of Embodiment 1, wherein the accessory includes one or more low battery indicators and wherein the control circuitry includes one or more voltage sensors, one or more voltage measurement circuits, and combinations thereof.

Embodiment 11

The accessory of Embodiment 10, wherein the control circuitry is operationally configured to indicate low battery voltage by periodically alternating a ON/OFF condition of the circuitry-controlled electrical output contacts when the one or more voltage measurement circuits determine battery voltage is less than a set value for the battery voltage.

Embodiment 12

The accessory of Embodiment 1, wherein the control circuitry comprises one or more motion sensors, one or more tilt sensors, one or more light sensors, one or more thermal sensors, one or more image sensors, one or more capacitive touch sensors, one or more biometric sensors, one or more time delay relay circuits, one or more clock circuits, one or more counter circuits, one or more wireless control circuits, one or more analog-to-digital converters, one or more digital-to-analog converters, one or more power regulation circuits, one or more voltage sensors, circuits to perform logic functions, one or more electromagnetic sensors, one or more global positioning system antennas, and combinations thereof.

Embodiment 13

The accessory of Embodiment 1, wherein the battery powered device includes a battery powered device battery compartment operationally configured to hold one or more removable batteries in electrical contact therewith and wherein the battery compartment of the accessory is operationally configured to hold the one or more removable batteries in electrical contact therewith for powering the accessory and the battery powered device when the accessory is in electrical communication with the battery powered device battery compartment.

Embodiment 14

The accessory of Embodiment 1, wherein the control circuitry comprises a printed circuit board including a microcontroller unit and a motion sensor in electrical communication with the microcontroller unit, wherein the motion sensor is operationally configured to detect motion of the accessory and wherein the microcontroller unit is programmed to turn the accessory OFF when no motion of the device is detected for a particular time period and programmed to turn the accessory ON when the motion sensor detects motion of the accessory.

Embodiment 15

The accessory of Embodiment 1, further comprising a battery compartment cover removably attachable to the battery compartment.

Embodiment 16

The accessory of Embodiment 1, wherein the battery powered device is a firearm optical sight.

Embodiment 17

An accessory for use with a device having a coin cell battery compartment, comprising:

(a) a battery compartment, the battery compartment comprising electrical input contacts operable with a coin cell battery;
(b) a battery compartment cover;
(c) control circuitry in electrical communication with the electrical input contacts; and
(d) circuitry-controlled electrical output contacts;

(e) wherein when the accessory is in electrical communication with the coin cell battery and when the accessory is in electrical contact with the coin cell battery compartment of the device, then the control circuitry is operationally configured to add one or more operating functions to the device.

Embodiment 18

The accessory of Embodiment 17, wherein the device is a firearm optical sight.

Embodiment 19

A method of providing one or more operating functions to a battery powered device powered by one or more removable batteries, comprising:

(a) electrically communicating an accessory with a battery powered device battery compartment of the battery powered device, the accessory comprising:

(1) a main body removably attachable to the battery powered device battery compartment, the main body including:

(i) a battery compartment, the battery compartment comprising electrical input contacts;

(ii) control circuitry in electrical communication with the electrical input contacts; and (iii) circuitry-controlled electrical output contacts;

(iv) wherein when the accessory is in electrical communication with a power source and when the accessory is in electrical communication with the battery powered device battery compartment, then the control circuitry is operationally configured to add the one or more operating functions to the battery powered device.

Embodiment 20

A method of providing one or more operating functions to a battery powered firearm optical sight powered by one or more removable batteries, comprising:

(a) electrically communicating an accessory with a firearm optical sight battery compartment of the firearm optical sight, the accessory comprising:

(1) a main body removably attachable to the firearm optical sight battery compartment, the main body including:

(i) a battery compartment, the battery compartment comprising electrical input contacts;

(ii) control circuitry in electrical communication with the electrical input contacts; and (iii) circuitry-controlled electrical output contacts;

(iv) wherein when the accessory is in electrical communication with a power source and when the accessory is in electrical communication with the firearm optical sight battery compartment, then the control circuitry is operationally configured to add the one or more operating functions to the firearm optical sight.

Embodiment 21

The method of Embodiment 19 and Embodiment 20, wherein the one or more operating functions comprise a motion sensing automatic ON/OFF function, a light sensing function, a thermal sensing function, a shock sensing function, one or more informational digital display functions, a video recording function, an audio recording function, a voice recognition function, a microphone function, an audible speaker function, one or more clock functions, one or more timer functions, one or more illumination functions, e.g., one or more indicator light functions, one or more flashlight functions, one or more wireless connectivity functions, i.e., wire-replacement communications technology, electrical communication port or interface functionality, and combinations thereof.

Embodiment 22

An accessory for firearm optical sight use, comprising:

(a) a battery compartment comprising a positive battery contact and a negative battery contact; and (b) control circuitry;

(c) wherein when a coin cell battery is in electrical contact with the positive battery contact and the negative battery contact and when the accessory is in electrical communication with a coin cell battery compartment of the firearm optical sight then the control circuitry is operationally configured to provide the firearm optical sight with a motion sensing automatic ON/OFF power function.

Embodiment 23

An accessory operable with a firearm optical sight battery compartment, comprising:

(a) a battery compartment; and (b) control circuitry in electrical communication with the battery compartment;

(c) wherein the accessory is operationally configured to maintain an electrical connection with a positive contact and a negative contact of the firearm optical sight battery compartment of the firearm optical sight; and (d) wherein the control circuitry is operationally configured to add one or more operating functions to the firearm optical sight.

Embodiment 24

An accessory operable with a firearm optical sight battery compartment, comprising:

(a) a battery compartment;

(b) control circuitry in electrical communication with the battery compartment;

(c) a positive power output contact in electrical communication with the control circuitry; and (d) a negative power output contact in electrical communication with the control circuitry;

(e) wherein the positive power output contact is operationally configured to electrically communicate with a firearm optical sight battery compartment positive input contact and the negative power output contact is operationally configured to electrically communicate with the firearm optical sight battery compartment negative input contact; and (f) wherein the control circuitry is operationally configured to add one or more operating functions to the firearm optical sight.

Embodiment 25

An accessory for use with a firearm optical sight, comprising:

(a) a main body removably attachable to a coin cell battery compartment of the firearm optical sight, the main body including:

(1) a battery compartment;
(2) control circuitry in electrical communication with the battery compartment;
(3) a positive power output contact in electrical communication with the control circuitry; and
(4) a negative power output contact in electrical communication with the control circuitry;
(5) wherein the positive power output contact is operationally configured to electrically communicate with a positive contact of a coin cell battery compartment of the firearm optical sight and wherein the negative power output contact is operationally configured to electrically communicate with a negative contact of the coin cell battery compartment of the firearm optical sight to power the firearm optical sight; and
(6) wherein the control circuitry is operationally configured to add one or more functions to the firearm optical sight.

Embodiment 26

A system, comprising:
(a) a firearm;
(b) an optical sight operably secured to the firearm, the optical sight comprising an illuminated reticle and a coin cell battery compartment; and
(c) an accessory, comprising:
(1) a battery compartment, the battery compartment comprising electrical input contacts;
(2) control circuitry in electrical communication with the electrical input contacts; and
(3) circuitry-controlled electrical output contacts;
(4) wherein when the accessory is in electrical communication with a power source and when the accessory is in electrical communication with the optical sight, then the control circuitry is operationally configured to add one or more operating functions to the optical sight.

Persons of ordinary skill in the art will recognize that many modifications may be made to the present disclosure without departing from the spirit and scope of the disclosure. The embodiment(s) described herein are meant to be illustrative only and should not be taken as limiting the invention, which is defined in the claims.

I claim:

1. An accessory for use with a battery powered device, comprising:
a battery compartment, the battery compartment comprising electrical input contacts;
control circuitry in electrical communication with the electrical input contacts; and
circuitry-controlled electrical output contacts;
wherein when the accessory is in electrical communication with a power source and when the accessory is in electrical communication with the battery powered device, then the control circuitry is operationally configured to add one or more operating functions to the battery powered device; and
wherein the control circuitry comprises one or more motion sensors, one or more tilt sensors, one or more light sensors, one or more thermal sensors, one or more image sensors, one or more capacitive touch sensors, one or more biometric sensors, one or more time delay relay circuits, one or more clock circuits, one or more counter circuits, one or more wireless control circuits, one or more analog-to-digital converters, one or more digital-to-analog converters, one or more power regulation circuits, one or more voltage sensors, circuits to perform logic functions, one or more electromagnetic sensors one or more global positioning system antennas, and combinations thereof.

2. The accessory of claim 1, wherein when the battery compartment is in electrical communication with one or more batteries and wherein when the accessory is in electrical communication with a battery powered device battery compartment, then the control circuitry is operationally configured to add the one or more operating functions to the battery powered device.

3. The accessory of claim 2, wherein the accessory comprises a main body removably attachable to the battery powered device battery compartment, wherein when the accessory is in electrical communication with the battery powered device battery compartment, then the circuitry-controlled electrical output contacts are in electrical contact with battery powered device battery compartment electrical input contacts.

4. The accessory of claim 1, wherein when one or more removable batteries are located within the battery compartment, wherein when the electrical input contacts are in electrical communication with the one or more removable batteries, and wherein when the circuitry-controlled electrical output contacts are in electrical contact with battery powered device battery compartment electrical input contacts, then the control circuitry is operationally configured to add the one or more operating functions to the battery powered device.

5. The accessory of claim 1, wherein when the battery compartment is in electrical communication with one or more batteries and wherein when the accessory is in electrical communication with a coin cell battery compartment of the battery powered device, then the control circuitry is operationally configured to add the one or more operating functions to the battery powered device.

6. The accessory of claim 1, wherein when the accessory is in electrical communication with the coin cell battery compartment of the battery powered device, then the circuitry-controlled electrical output contacts are in electrical contact with battery powered device battery compartment electrical input contacts.

7. The accessory of claim 1, wherein the control circuitry includes one or more timers.

8. The accessory of claim 7, wherein the one or more operating functions comprise a motion sensing automatic ON/OFF power function.

9. The accessory of claim 7, wherein the control circuitry is operationally configured to deactivate the circuitry-controlled electrical output contacts after a set period of accessory non-motion is realized setting the accessory to an OFF position and wherein the control circuitry is operationally configured to activate the circuitry-controlled electrical output contacts when the control circuitry detects accessory motion.

10. The accessory of claim 1, wherein the accessory includes one or more low battery indicators and wherein the control circuitry includes one or more voltage measurement circuits.

11. The accessory of claim 10, wherein the control circuitry is operationally configured to indicate low battery voltage by periodically alternating a ON/OFF condition of the circuitry-controlled electrical output contacts when the one or more voltage measurement circuits determine battery voltage is less than a set value for the battery voltage.

12. The accessory of claim 1, wherein the battery powered device includes a battery powered device battery compartment operationally configured to hold one or more removable batteries in electrical contact therewith and wherein the battery compartment of the accessory is operationally configured to hold the one or more removable batteries in electrical contact therewith for powering the accessory and the battery powered device when the accessory is in electrical communication with the battery powered device battery compartment.

13. The accessory of claim 1, wherein the control circuitry further comprises a printed circuit board including a microcontroller unit, wherein the one or more motion sensors are in electrical communication with the microcontroller unit, wherein the one or more motion sensors are operationally configured to detect motion of the accessory and wherein the microcontroller unit is programmed to turn the accessory OFF when no motion of the accessory is detected for a particular time period and programmed to turn the accessory ON when the one or more motion sensors detect motion of the accessory.

14. The accessory of claim 1, further comprising a battery compartment cover removably attachable to the battery compartment.

15. An accessory for use with a device having a coin cell battery compartment, comprising:

a battery compartment, the battery compartment comprising electrical input contacts operable with a coin cell battery;

a battery compartment cover;

control circuitry in electrical communication with the electrical input contacts; and circuitry-controlled electrical output contacts;

wherein when the accessory is in electrical communication with the coin cell battery and when the accessory is in electrical contact with the coin cell battery compartment of the device, then the control circuitry is operationally configured to add one or more operating functions to the device; and wherein the control circuitry comprises one or more motion sensors, one or more tilt sensors, one or more light sensors, one or more thermal sensors, one or more image sensors, one or more capacitive touch sensors, one or more biometric sensors, one or more time delay relay circuits, one or more clock circuits, one or more counter circuits, one or more wireless control circuits, one or more analog-to-digital converters, one or more digital-to-analog converters, one or more power regulation circuits, one or more voltage sensors, circuits to perform logic functions, one or more electromagnetic sensors, one or more global positioning system antennas, and combinations thereof.

16. An accessory for use with a firearm optical sight, comprising:

a battery compartment, the battery compartment comprising electrical input contacts;

control circuitry in electrical communication with the electrical input contacts; and circuitry-controlled electrical output contacts;

wherein when the accessory is in electrical communication with a power source and when the accessory is in electrical communication with the firearm optical sight, then the control circuitry is operationally configured to add one or more operating functions to the firearm optical sight; and wherein the control circuitry comprises one or more motion sensors, one or more tilt sensors, one or more light sensors, one or more thermal sensors, one or more image sensors, one or more capacitive touch sensors, one or more biometric sensors, one or more time delay relay circuits, one or more clock circuits, one or more counter circuits, one or more wireless control circuits, one or more analog-to-digital converters, one or more digital-to-analog converters, one or more power regulation circuits, one or more voltage sensors, circuits to perform logic functions, one or more electromagnetic sensors, one or more global positioning system antennas, and combinations thereof.

17. The accessory of claim 16, wherein when the battery compartment is in electrical communication with one or more batteries and wherein when the accessory is in electrical communication with a firearm optical sight battery compartment, then the control circuitry is operationally configured to add the one or more operating functions to the firearm optical sight.

18. The accessory of claim 17, wherein the accessory comprises a main body removably attachable to the firearm optical sight battery compartment, wherein when the accessory is in electrical communication with the firearm optical sight battery compartment, then the circuitry-controlled electrical output contacts are in electrical contact with firearm optical sight battery compartment electrical input contacts.

* * * * *